(12) United States Patent
Hampapur et al.

(10) Patent No.: US 8,799,042 B2
(45) Date of Patent: Aug. 5, 2014

(54) DISTRIBUTION NETWORK MAINTENANCE PLANNING

(75) Inventors: Arun Hampapur, Norwalk, CT (US); Jayant R. Kalagnanam, Tarrytown, NY (US); Emmanuel Yashchin, Yorktown Heights, NY (US); Yada Zhu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 13/205,190

(22) Filed: Aug. 8, 2011

(65) Prior Publication Data

US 2013/0041705 A1   Feb. 14, 2013

(51) Int. Cl.
*G06Q 10/00*   (2012.01)
(52) U.S. Cl.
USPC ........................................ 705/7.12; 705/7.41
(58) Field of Classification Search
USPC ............................................. 705/7.12, 7.41
See application file for complete search history.

(56) References Cited

U.S. PATENT DOCUMENTS

| | | | |
|---|---|---|---|
| 5,308,193 A | 5/1994 | Rufolo | |
| 6,216,169 B1 * | 4/2001 | Booman et al. | 709/246 |
| 6,651,012 B1 * | 11/2003 | Bechhoefer | 702/34 |
| 6,871,160 B2 * | 3/2005 | Jaw | 702/182 |
| 7,124,059 B2 | 10/2006 | Wetzer et al. | |
| 7,203,622 B2 | 4/2007 | Pan et al. | |
| 7,383,157 B1 | 6/2008 | Park et al. | |
| 7,395,216 B2 | 7/2008 | Rosenfeld et al. | |
| 7,415,388 B2 | 8/2008 | Hachmann et al. | |
| 7,421,372 B1 | 9/2008 | Moss et al. | |
| 7,457,762 B2 * | 11/2008 | Wetzer et al. | 705/7.25 |
| 7,457,763 B1 | 11/2008 | Garrow et al. | |
| 7,689,873 B1 | 3/2010 | Bennett | |
| 8,473,089 B2 * | 6/2013 | Albarede et al. | 700/121 |
| 2004/0193467 A1 | 9/2004 | Williams et al. | |
| 2008/0312990 A1 * | 12/2008 | Byrne | 705/7 |
| 2009/0044056 A1 | 2/2009 | Itoh | |
| 2009/0132321 A1 | 5/2009 | Kamisuwa et al. | |
| 2010/0169048 A1 | 7/2010 | Hanreich et al. | |

OTHER PUBLICATIONS

Spall, J. C., "Stochastic Optimization", Handbook of Computational Statistics, Copyright Springer Heidelberg 2004.

(Continued)

*Primary Examiner* — Jonathan G Sterrett
*Assistant Examiner* — Folashade Anderson
(74) *Attorney, Agent, or Firm* — Scully, Scott, Murphy & Presser, P.C.; Daniel P. Morris, Esq.

(57) ABSTRACT

A system, method and computer program product for maintaining an infrastructure of components. The system receives structured data, unstructured data, and infrastructure data from a database. The system runs at least one statistical and optimization modeler with one or more of: the received structured data, the received unstructured data and the received infrastructure data, in order to calculate a health index of at least one component of the infrastructure. The health index represents a health attribute of the at least one component. The system establishes at least one maintenance plan of the infrastructure, based on the calculated health index. Each established maintenance plan is associated with at least one health index. The system compares health indices of the at least one established maintenance plan. The system selects a plan, among the at least one established maintenance plan, whose health index is a maximum among the compared health indices.

24 Claims, 14 Drawing Sheets

(56) References Cited

OTHER PUBLICATIONS

Evans, A. A., "Maximum Likelihood Estimation", San Francisco State University, BIO 710 Advanced Biometry Spring 2008.

Rutenbar, R. A., "Simulated Annealing Algorithms: An Overview," Jan. 1989, IEEE.

Selvik, J. T., et al., "A frameworkfor-reliabilityandriskcenteredmaintenance", Reliab. Eng. Syst. Safety 2010.

Christodoulou, S., et al., "Risk-based asset management of water piping networks using neurofuzzy systems", Computers, Environment and Urban Systems, 2009, 33, pp. 138-149.

Ugarelli, R., et al., "Optimal Scheduling of Replacement and Rehabilitation in Wastewater Pipeline Networks", Journal of Water Resources Planning and Management, May/Jun. 2010, vol. 136, No. 3, pp. 348-356.

Hadzilacos, T., et al., "UtilNets: a water mains rehabilitation decision-support system", Computers, Environment and Urban Systems, May 31, 2000, vol. 24, Issue 3, pp. 215-232.

\* cited by examiner

| Components | Time | Intervention Action | Resources |
|---|---|---|---|
| pipe segment at location [latitude, longitude]=[38.1427, 79.4531] | Next Monday | Replacement | Spare parts, 3 technician, Equipment A, B, and C |
| pipe segment at location [latitude, longitude]=[38.2316, 79.7780] | Next Tuesday | Inspection | 1 technician, Equipment A |

FIG. 13

| Components | Time | Actions |
|---|---|---|
| Valves [23, 25, 77, 1023, 5000] | Quarter 1 | Preventive inspection |
| Pipe segments in the region of [latitude, longitude] = [38.2316, 79.7780] to [39.1001, 80.2367] | Quarter 2 | Replacement |

FIG. 14

DISTRIBUTION NETWORK MAINTENANCE PLANNING

BACKGROUND

The present application generally relates to maintaining infrastructure. More particularly, the present application relates to automatically establishing a maintenance plan of an infrastructure.

Drinking water in big cities (e.g., New York City, Chicago, etc.) is mostly transported through underground mains. A failure in such mains can cause not only substantial financial loss (e.g., spending more than $100,000 to repair, etc.) but also significant harm (e.g., contaminating drinking water, etc.) and social consequences (e.g., blocking traffic roads to repair the failed main(s)). There exist total 880,000 miles of water mains in United States. In average, 237,600 water main breaks occur per year. Those water main breaks causes $2.4 billion in loss annually.

Traditional concerns in an infrastructure network maintenance planning include, but not limited, the following issues:
  a. There exists sparse historical data (e.g., prior maintenance record).
  b. Repair condition of the infrastructure network may be harsh due to weather, time pressure, road traffic, and limited maintenance funding.
  c. The traditional method predicts a future maintenance based on only a structure of the infrastructure network and expected life times of components in the infrastructure network.
  d. Inspection cost of the infrastructure network is expensive (e.g., more than $10,000) because the network is usually buried in underground.
  e. Notwithstanding the expensive cost, the traditional method involves periodic monitoring of the infrastructure network, e.g., by performing periodic inspection of the infrastructure network.
  f. Traditional methods lack a cost-effective maintenance planning.
  g. Traditional methods lack a criterion reflecting an effectiveness of a possible maintenance action.
  h. Traditional methods do not jointly consider an availability of spare parts, an availability of resources (e.g. workforce, equipment), and job scheduling (e.g. determining an order or priority of maintenances).

SUMMARY OF THE INVENTION

The present disclosure describes a system, method and computer program product for maintaining an infrastructure of components, e.g., water pipes, gas pipes, bridges, tunnels, roads, etc.

In one embodiment, there is provided a system for maintaining an infrastructure of components. The system includes a computing system that comprises at least one memory device and at least one processor connected to the memory device. The computing system receives structured data, unstructured data, and infrastructure data from a database. The computing system runs at least one statistical and optimization modeler with one or more of: the received structured data, the received unstructured data and the received infrastructure data, in order to calculate a health index of at least one component of the infrastructure. The health index represents a health attribute of the at least one component. The computing system establishes at least one maintenance plan of the infrastructure, based on the calculated health index. Each established maintenance plan is associated with at least one health index. The computing system compares health indices of the at least one established maintenance plan. The computing system selects a plan, among the at least one established maintenance plan, whose health index is a maximum among the compared health indices.

In a further embodiment, the statistical and optimization modeler includes one or more of: a statistical modeler, a nonlinear optimizer, a stochastic optimizer, and a heuristic optimizer.

In a further embodiment, the established maintenance plan specifies one or more of: a subset of components, a timing, intervention actions, and a resource requirement, the subset of components representing parts that need an inspection or repair, the timing representing when the inspection or repair is performed, the intervention actions representing actions that can be taken to perform the inspection or repair, the resource requirement representing materials, and equipment needed to perform the inspection or repair.

In a further embodiment, the structured data includes one or more of: a physical property of the component, an operational condition of the component, an environmental factor of the component, a maintenance history record of the component, parts and suppliers of the component, and a human activity associated with the component.

In a further embodiment, the infrastructure data includes one or more of: a service reliability of the infrastructure, an availability of the infrastructure, a status of deterioration of the infrastructure, an intervention history of the infrastructure, and an impact of a failure of the infrastructure.

In a further embodiment, the unstructured data includes one or more of: expert knowledge associated with the component, engineering knowledge associated with the component, equipment information of the component, manufacturer information of the component, an installation year of the component, and an operating condition of the component.

In a further embodiment, the health index is computed as a mathematical function of the structured data, the infrastructure data, and the unstructured data.

In a further embodiment, the health index (HI) is calculated according to: $HI = -(F \times R + W) \times 1$, wherein the F represents a vector representing failure probabilities of components in the infrastructure, R represents a spatial correlation value of those components and the W represents a time elapsed since a last maintenance of the component, and 1 represents a vector of ones (this corresponds to summation of health indices of the components).

In a further embodiment, the computing system specifies, according to the selected plan, at least one determined action and at least one undetermined action. The computing system implements the at least one determined action. The computing system re-calculates the health index after the implementation of the at least one determined action. The computing system compares the re-calculated health index against a pre-determined threshold. The computing system determines whether to implement the at least one undetermined action based on the comparison.

In a further embodiment, the computing system is further configured to determine at least one constraint associated with performing maintenance of the infrastructure. The computing system is configured to determine a long-term maintenance plan associated with the infrastructure, based on the calculated health index of components in the infrastructure and the determined constraint. The computing system estimates a cost of the determined long-term maintenance plan. The computing system determines a first short-term maintenance plan associated with the infrastructure. The determined first short-term maintenance plan specifies one or more of: the subset of components, the timing, the intervention actions, and the resource requirement. The computing system performs an action, among the intervention actions, specified in the determined first short-term maintenance plan. The computing system updates the determined constraint after performing the specified action. The computing system re-calculates the health index of the components in the infrastructure after performing the specified action. The computing system repeatedly performs determining the constraint, determining the long-term maintenance plan, estimating the cost, determining the first short-term maintenance plan, performing the action, updating the determined constraint, and re-calculating the health index.

In a further embodiment, the constraint includes one or more of: an availability of spare parts, labor cost, cost of the spare parts, equipment cost, an availability of labor, a traffic condition, a weather condition, a safety condition, an availability of equipment, and a population density.

In a further embodiment, to determine the long-term maintenance plan, the computing system aggregates pre-determined short-term maintenance plans of the infrastructure, based on the determined constraint and the calculated health index, wherein the determined long-term maintenance plan specifies a group of components to maintain in each short-term.

In a further embodiment, to estimate the cost, the computing system adds a labor cost for the determined long-term maintenance plan and equipment and material cost for the determined long-term maintenance plan.

In a further embodiment, to determine the first short-term maintenance plan, the computing system runs the stochastic optimizer with cost parameters, a scenario tree, the determined constraint, a current situation associated with the infrastructure, the calculated health index, and the determined long-term plan. The computing system outputs, from the stochastic optimizer, the first short-term maintenance plan.

In a further embodiment, the scenario tree lists the intervention actions under the calculated health index. The scenario tree includes a plurality of nodes. A root node in the scenario tree represents the calculated health index. A first level in the scenario tree includes at least one node representing at least one action that can be taken under the calculated health index. A second level of the scenario tree includes at least one node representing a health index calculated after an action at the first level of the scenario tree is performed. A third level of the scenario tree includes at least one node representing at least one action that can be taken under the health index at the second level of the scenario tree. A leaf node in the scenario tree represents spare parts and a workforce needed to perform an action or option described in a corresponding parent node.

In a further embodiment, the computing system is further configured to generate a work schedule and work contract based on the determined first short-term maintenance plan, the generated work schedule specifying one or more of: a list of components to inspect or repair, actions to be taken to inspect or repair the components in the list, an estimated time to conduct the inspection or repair, an estimated time that the inspection or repair is completed, required materials and equipments to perform the inspection or repair. The generated work contract specifies one or more of: what type of skilled workers are needed to perform the inspection or repair, an estimation of a number of work hours needed per each type of skilled workers until the inspection or repair is completed, a labor cost per each skilled worker needed, additional cost associated with the undetermined action, and an estimated cost to perform an initial investigation.

In a further embodiment, the computing system is configured to determine a second short-term maintenance plan after performing the action according to the determined first short-term maintenance plan. The computing system repeatedly performs determining the first short-term maintenance plan, letting a user or an entity perform the action, and determining the second short-term maintenance plan.

In a further embodiment, to determine the second short-term maintenance plan, the computing system runs the nonlinear optimizer with the cost parameters, the scenario tree, the re-calculated health index, the updated constraint, the current situation associated with the infrastructure, and the determined first long-term plan. The computing system outputs, from the nonlinear optimizer, the second short-term maintenance plan.

BRIEF DESCRIPTION OF THE DRAWINGS

The accompanying drawings are included to provide a further understanding of the present invention, and are incorporated in and constitute a part of this specification.

FIG. 13 illustrates an exemplary short-term maintenance plan in one embodiment.

FIG. 14 illustrates an exemplary long-term maintenance plan in one embodiment.

DETAILED DESCRIPTION

In one embodiment, an infrastructure (network) includes, but is not limited to: interconnected pipes of water mains, interconnected pipes of gas mains, interconnected pipes of electricity transmission lines, etc. A component in the infrastructure (network) includes, but is not limited to: a part or portion of the infrastructure (network), etc. A cost of social loss includes, but is not limited to: an estimated damage to the public due to a repair or replacement of a component of the infrastructure network. For example, if a restaurant could not operate for a day due to a break of a water main supplying the restaurant, the damage of the restaurant may be, for example, a financial loss caused by not being able to serve customers for that day. A long-term range includes, but is not limited to: duration of a month, duration of a year, duration of five years, duration of ten years, etc. A short-term range includes, but is not limited to: duration a day, duration of a week, duration of a month, etc.

In one embodiment, a health index of a component represents one or more of: an availability of the component in the infrastructure, a probability of a failure of the component, a residual life of the component, a rate of an occurrence of failure events associated with the component, and an estimated failure risk of that component under a realistic operating condition, etc. A health index of the component may also be represented by a function of factors including, but not limited to: a service reliability needed to repair the component (e.g., an ability of a pipe to supply drinking water of desired quality over a time period), a system availability associated with the component (e.g., in a given time period, the operating time of the component vs. the operating time+downtime of the component, or Mean Time Between Failure (MTBF) vs. MTBF+Mean Time To Repair (MTTR)), a maintenance history associated with the component (e.g., an installation of a clamp on a pipe segment 1 year ago).

Figure 2:
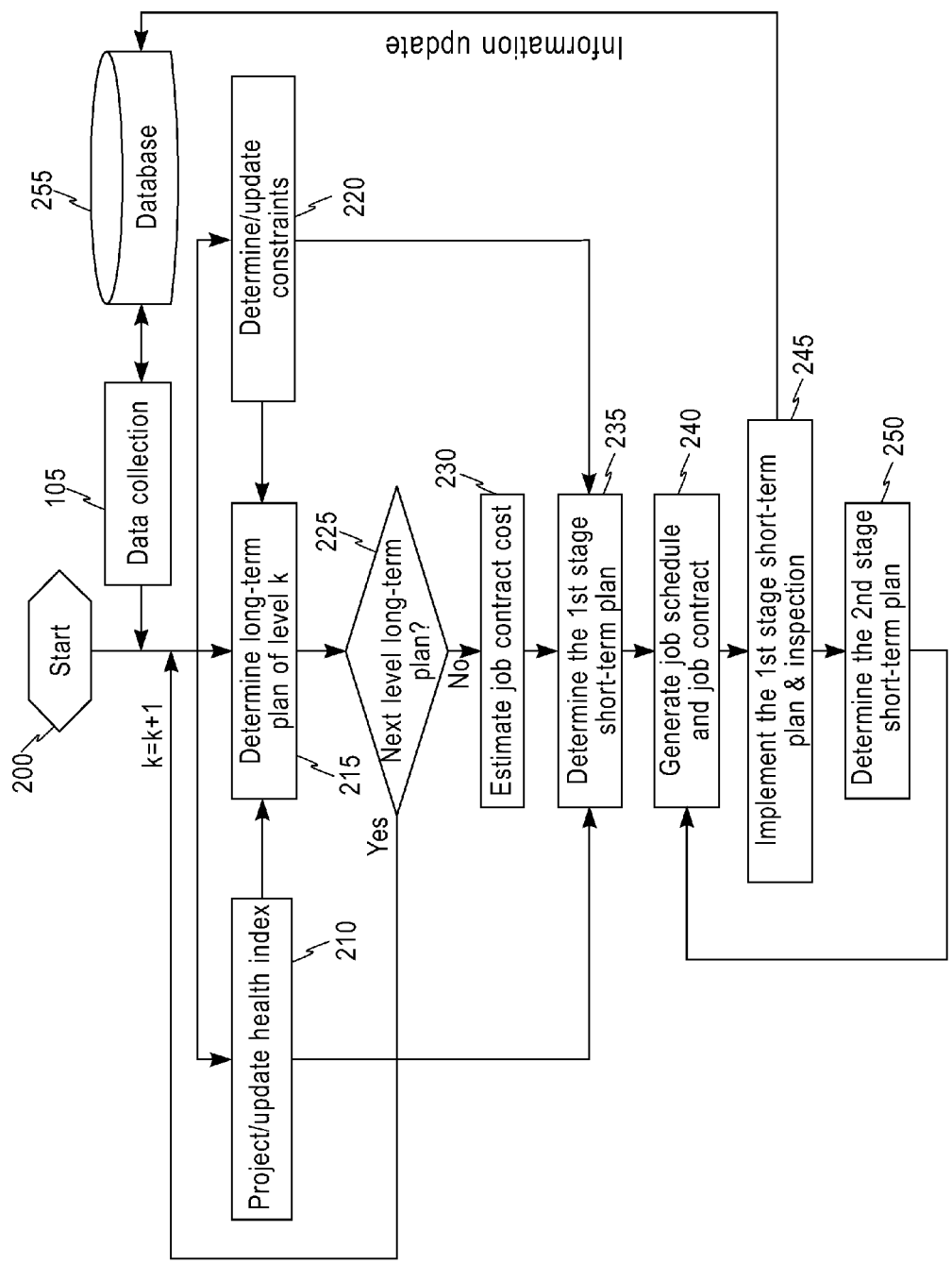
FIG. 2 illustrates a flow chart that describes method steps for maintaining an infrastructure of components in one embodiment.
Figure 6:
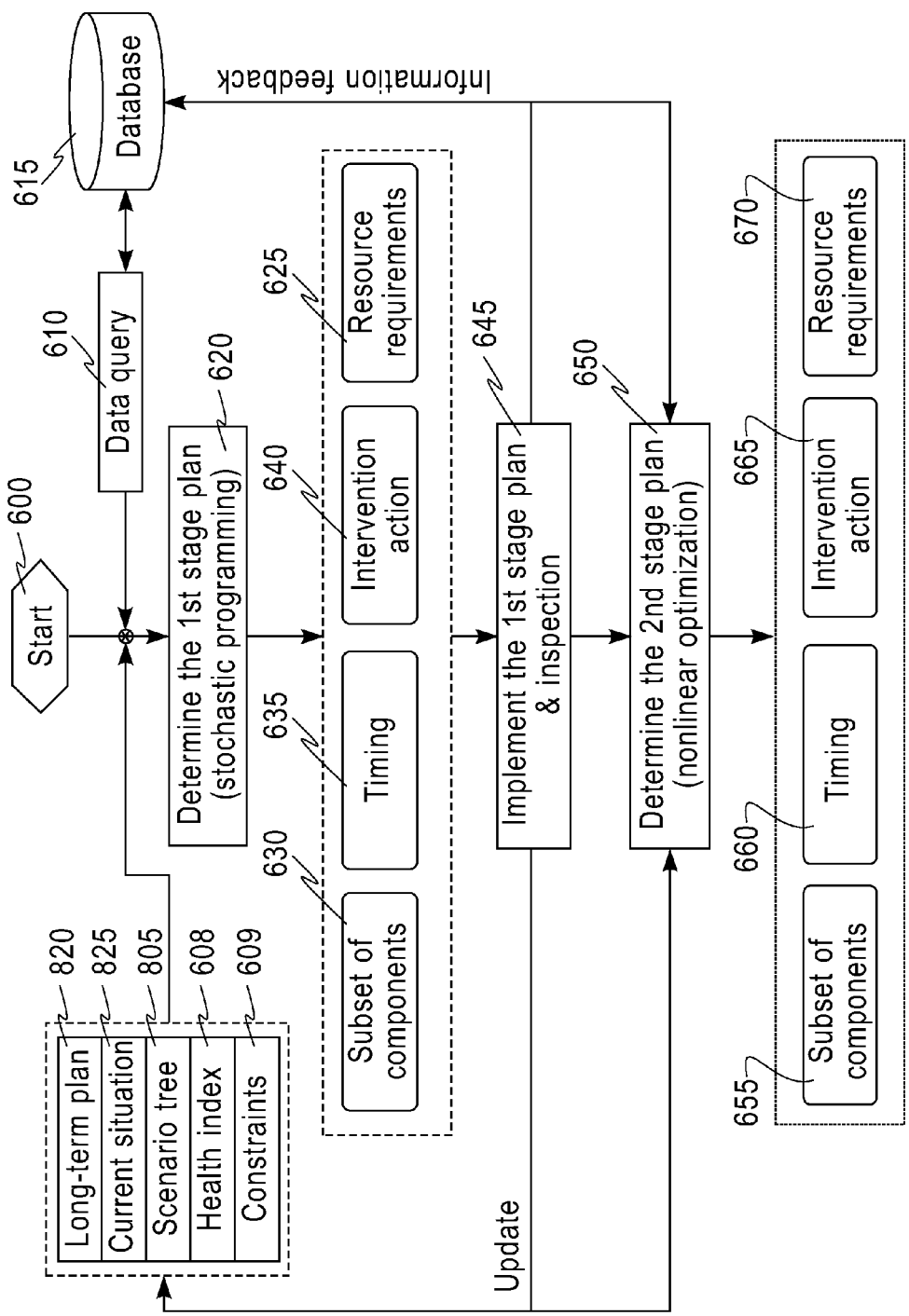
FIG. 6 illustrates a flow chart that describes method steps for determining short term plans in one embodiment.

In one embodiment, the computer-implemented system and method provide a mixed data-driven approach for infrastructure health prediction and maintenance decision-making in terms of what, when and how to intervene. The system and method provide a two-stage method for planning and running proactive/reactive maintenance for maximizing infrastructure health index and minimizing cost of social loss. A health index of a component of the infrastructure represents a health attribute of that component. In one embodiment, the health index (HI) of that component is calculated according to: $HI=-(F \times R+W) \times 1$, wherein the F represents a vector representing failure probabilities of one or more components in the infrastructure, R represents a spatial correlation value of those components and the W represents a time elapsed since a last maintenance of the component, and 1 represents a vector of ones, e.g., [1 1 1 1 . . . 1 1 1], (this corresponds to summation of health indices of the components). In one embodiment, the expected number of failure of a component in a time period may be obtained, e.g., from a database 255 shown in FIG. 2. The database 255 may store statistics of prior failure of all components. As shown in FIGS. 2 and 6, the method and system facilitate planning of a maintenance schedule, managing one or more resource(s) and constraint(s), generating a job schedule, creating a contract, and ordering spare parts. FIGS. 2 and 6 are described in detail below.

Benefits of the present invention include, but are not limited to: 1. providing a scientific plan even if historical data (e.g., prior maintenance records) is sparse; 2. reducing an impact of uncertainty of infrastructure deterioration status, e.g., through adaptive planning. The adaptive planning refers to not only planning actions directly related to a current phase (e.g., a current short-term, etc.) but also preparing possible actions in a next phase (e.g., a next short-term, etc.) that can be implemented depending upon inspection results after implementing the planned action in the current phase; 3. using resources more efficiently, e.g., by planning a maintenance ahead, preparing for an expected and unexpected situation, and taking into account future intervention options and resource needs; and 4. maximal improvement of infrastructure health and minimal cost of social loss, e.g., selecting and implementing a maintenance plan whose health index is a maximum.

In one embodiment, a computing system (e.g., a computing system 900 shown in FIG. 10) is configured to develop a maintenance plan of an infrastructure network (e.g., interconnected water pipe(s), interconnected gas pipe(s), etc.) that achieves a maximal improvement in healthiness of that infrastructure health with a minimal cost of social loss under uncertain infrastructure deterioration conditions, e.g., by running method steps described in FIG. 2. In one embodiment, the computing system is configured to predict healthiness of at least one component of an infrastructure, e.g., by calculating a health index of the component as described above. In one embodiment, the computing system develops a maintenance plan of the infrastructure, e.g., by taking into account future intervention options and resource needs determined by running method steps in FIG. 6.

Figure 3:
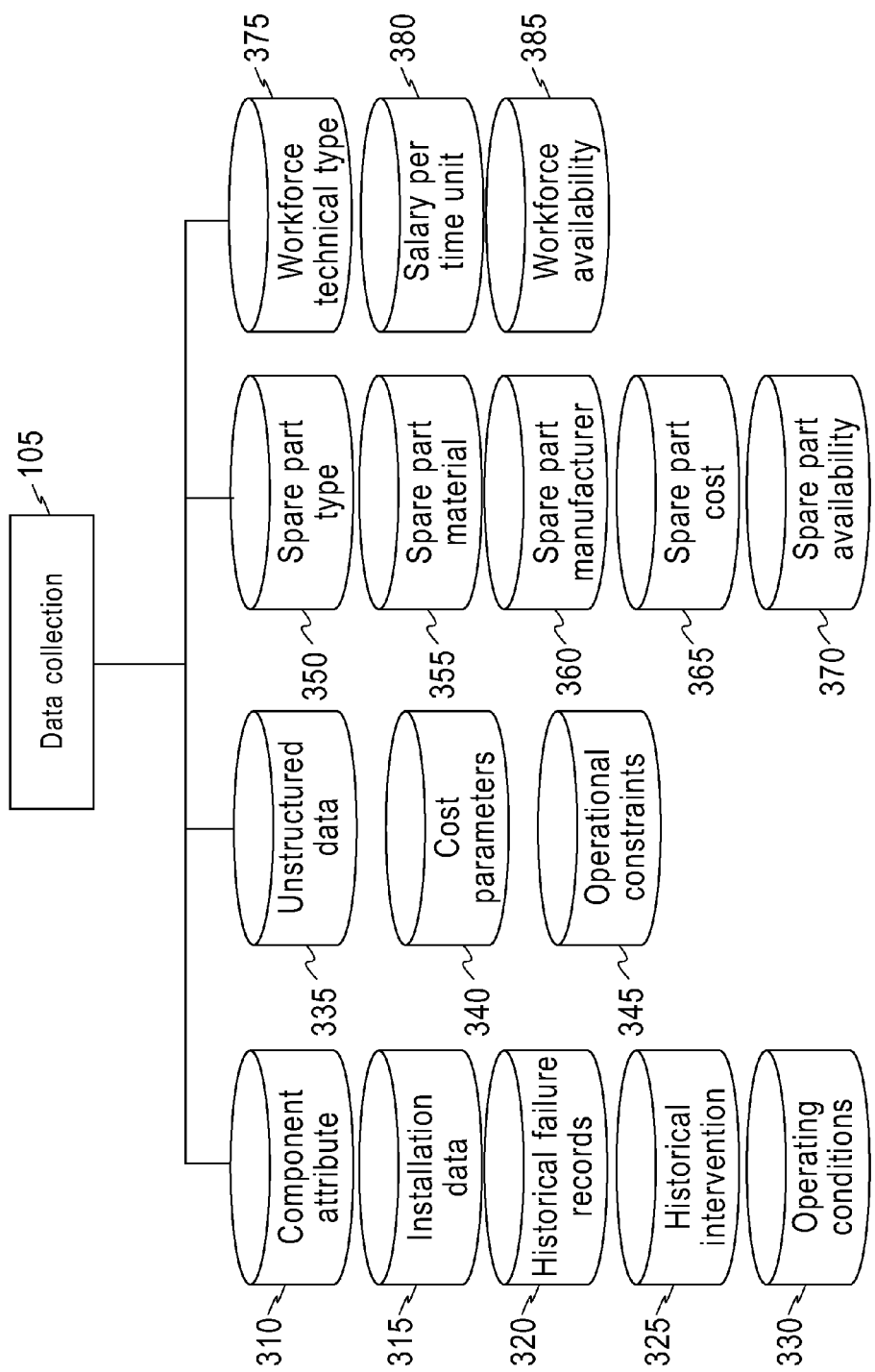
FIG. 3 illustrates a composition of data collection in one embodiment.

In one embodiment, an uncertainty related to deterioration conditions of an infrastructure network is reduced, e.g., by taking into account diverse data set shown FIG. 3 when the computing system is developing a maintenance plan. In one embodiment, a flexibility of resource allocations is enhanced, e.g., by generating long-term maintenance plans and planning job schedules ahead. In one embodiment, to develop the maintenance plan, the computing system takes into account the infrastructure health index and cost of social loss. The maintenance plan describes at least one component in the infrastructure to repair or replace and timing of the repair or replacement and resources needed to repair or replacement and constraints associated with the repair and replacement. In one embodiment, the computing system updates the health index and constraints based on feedback information received after performing a maintenance plan. An example of this feedback information includes, but is not limited to: health index updated after completion of actions in a current phase, and inspection of the component after the repair or the replacement, e.g. a level of improvement of survival probability for pipes.

Figure 1:
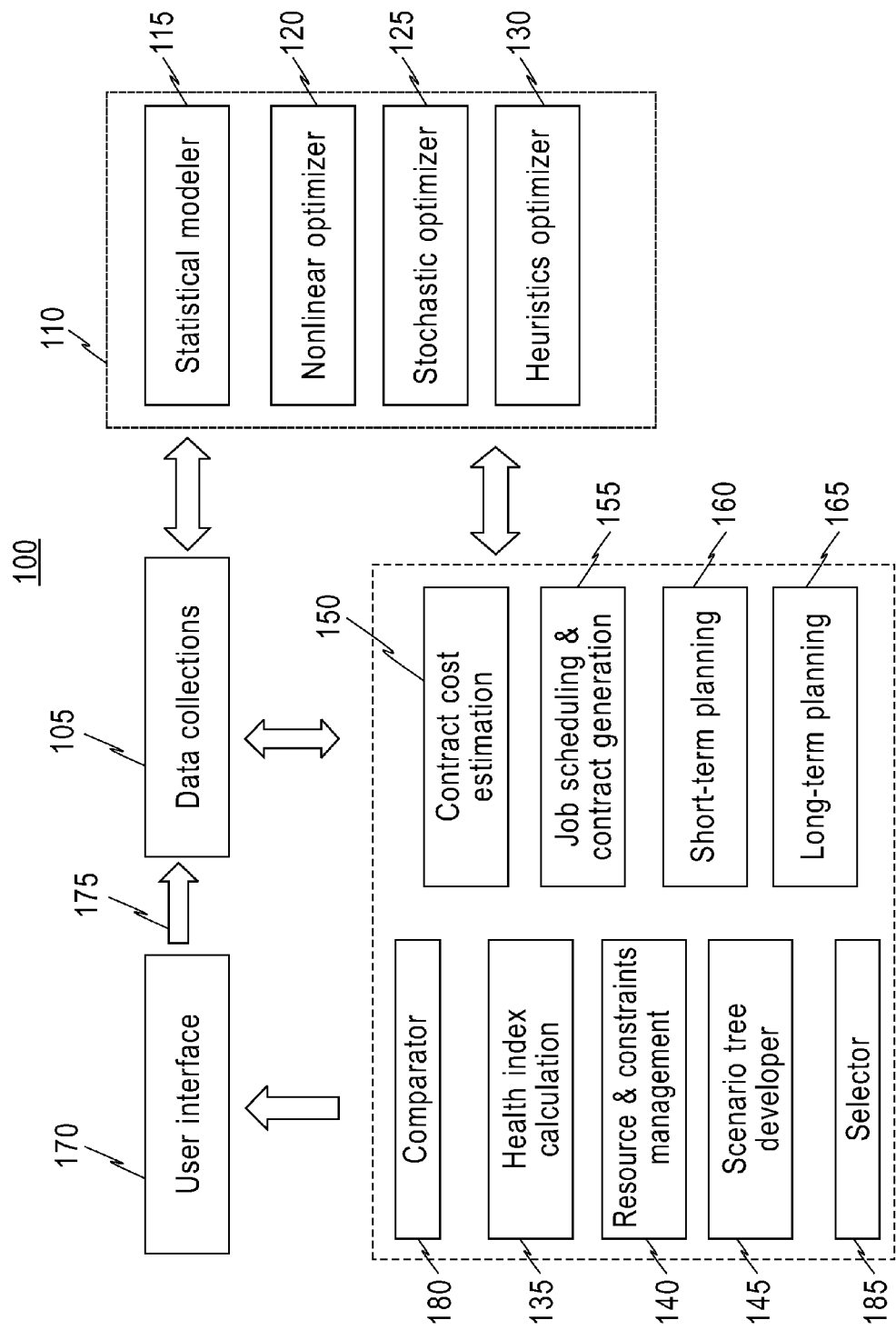
FIG. 1 illustrates a system diagram for maintaining an infrastructure of components in one embodiment.

FIG. 1 is a system diagram 100 that illustrates data processing modules for maintaining an infrastructure of components in one embodiment. There are provided, at least, a user interface 170, data collection module 105 (e.g., database), a statistical and optimization modeler 110, a health index calculation module 135, a resource and constraints management module 140, a scenario tree developer module 145, a contract cost estimation module 150, a job scheduling and contract generation module 155, a short-term planning module 160, and a long-term planning module 165.

A user interface 170 may be a graphical user interface or (touch screen) display device that shows a maintenance plan resulted from running the method steps in FIG. 2. FIG. 3 illustrates exemplary data collected and stored by the data collection module 105. The data collection module 105 which may be implemented by a database or a memory storage device stores the following including, but not limited to: at least one attribute 310 of at least one component of an infrastructure, an installation date 315 of the component, a history 320 of failures associated with the infrastructure, a history 325 of maintenance operations associated with the infrastructure, an operating condition 330 of the infrastructure, unstructured data 335, information of cost parameters 340, information of operational constraints 345, information of types of spare parts 350, information of spare part material 355, information of a manufacture 360 of spare parts, information of a cost 365 of the spare parts, information of an availability 370 of the spare parts, information of workforce type 375, information of workforce skills (not shown), information of workforce salary 380, and information of workforce availability 385. The data collection 105 may store these information 310-385 in one or more table (not shown) and/or in a standard data structure (e.g., string, vector, linked list, etc.).

In one embodiment, a user may enter 175, through the user interface 170, one or more of these information 310-385 into the data collection module 105. Alternatively, these information 310-385 and the subset of these information 310-385 may be automatically entered into the data collection module 105, e.g., by automatically collecting and storing these information in a database or Internet. The statistical and optimization modeler 110 include, but is not limited to: a statistical modeler 115, a nonlinear optimizer 120, a stochastic optimizer 125 and a heuristic optimizer 130. The statistical modeler 115 includes, but is not limited to: IBM®SPSS®Modeler, and is used to estimate a health index of a component of an infrastructure. The nonlinear optimizer 120 includes, but is not limited to: IBM®CPLEX®Optimizer. The nonlinear optimizer 120 optimizes the estimated health index for the short and long term maintenance plans. For example, suppose that a health index representing an availability of the infrastructure is calculated by $HI=(T_p-E[\text{downtime}])/T_p$, where the expected downtime ("E[downtime]") of the infrastructure is a nonlinear function calculated by the nonlinear optimizer 120 and $T_p$ stand for a planning horizon (e.g., a time period representing a short term or long term). The stochastic optimizer 125 performs a stochastic optimization. The stochastic optimization is described in detail, James C. Spall, "Stochastic Optimization," Handbook of Computational Statistics, Springer Heidelberg, 2004, wholly incorporated by reference as if set forth herein. The stochastic optimization is used to determine time duration of a long-term maintenance plan. The heuristic optimizer 130 includes, but is not limited to: IBM® ILOG CPLEX CP Optimizer. The heuristic optimizer 130 determines an optimal combination of components to maintain for both the short and long term maintenance plans. The heuristic optimizer 130 determines the optimal combination of components, e.g., by evaluating health indices associated with maintenance plans at different phases (e.g., different short terms or different long terms) and then attempting to select different combinations of components for a maintenance up to a certain number of iterations or until convergence criteria are met. The selection of components in an iteration can be based on a known generic algorithm or a known simulated annealing algorithm. A reference to Rob A. Rutenbar, entitled "Simulated Annealing Algorithms: An Overview," January 1989, IEEE, wholly incorporated by reference as if set forth herein, describes simulated annealing algorithms in detail.

In one embodiment, the health index calculation module 135 develops a statistical model (e.g., $HI=(T_p-E[\text{downtime}])/T_p$) to estimate or update health indices of components in an infrastructure, e.g., by using historical data. The health index calculation module 135 projects and updates an HI (health index) of a component of an infrastructure upon an inspection, a diagnostic test and/or repair of the component of the infrastructure. The health index calculation module 135 determines one or more components or cluster of components with a high failure risk (e.g., a risk to fail is larger than 80%) and components with low health indices (e.g., a value of a health index is less than 0.3).

The short-term planning module 160 determines one or more short-term maintenance plans, e.g., by running method steps in FIG. 6. The long-term planning module 165 determines one or more long-term maintenance plans, e.g., by running method steps in FIG. 2. FIG. 13 illustrates an exemplary short-term maintenance plan in one embodiment. For example, the exemplary short-term maintenance plan shown in FIG. 13 specifies component(s) (locations of the component(s)), action(s) to be taken on the component(s), an estimated time to implement those action(s), resource(s) needed to implement those action(s). FIG. 14 illustrates an exemplary long-term maintenance plan in one embodiment. The exemplary long-term maintenance plan shown in FIG. 14 specifies component(s) (locations of the component(s)), action(s) to be taken on the component(s), estimated time period(s) to implement those action(s).

Figure 4:
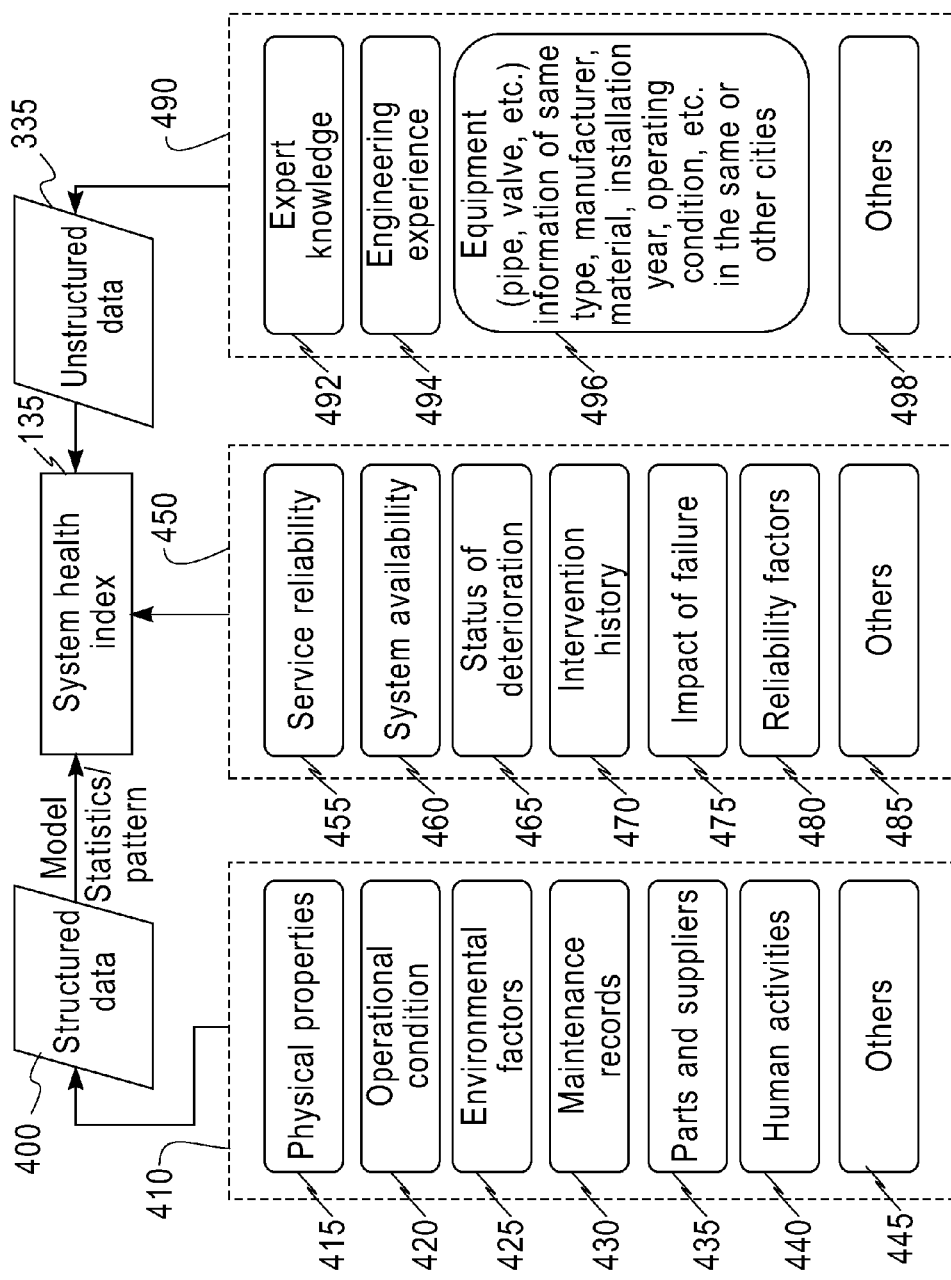
FIG. 4 illustrates a composition of structured data, a composition of infrastructure data, and a composition of unstructured data in one embodiment.

To determine a long-term or short-term maintenance plan of an infrastructure, as shown in FIG. 4, the health index calculation module 135 receives structured data 400, unstructured data 335 and infrastructure data 450 from the data collection 105. The structured data includes one or more of: a physical property 415 (e.g., length, etc.) of the component, an operational condition 420 (e.g., a working temperature, etc.) of the component, an environment factor 425 of the component (e.g., any hazard associated with the component), a maintenance record 430 of the component, parts and suppliers 435 of the component, a human activity 440 (e.g., repair or replacement activities, etc.) associated with the component, and other information 445. The structured data may be represented in a standard data structure (e.g., string, vector, list, etc.).

The infrastructure data 450 includes one or more of: a service reliability 455 of the infrastructure (e.g., an ability of pipes to supply drinking water of desired quality over time), an availability 460 of the infrastructure (e.g., an operating time of the infrastructure vs. an operating time+downtime of the infrastructure), a status of deterioration 465 of the infrastructure (e.g., corrosion of pipes), an intervention history 470 of the infrastructure (e.g., an installation of a clamp on a pipe segment 1 year ago), a societal impact of a failure 475 of the infrastructure (e.g., a burst of water pipes can cause flooding of a road or traffic blockage), a reliability 480 of the infrastructure and others 485 (e.g., a survival probability of various components over a time period). The unstructured data 335 includes one or more of: expert knowledge 492 associated with the component, engineering knowledge 494 associated with the component, equipment information 496 of the component, manufacturer information of the component, installation year of the component, operating condition of the component, and others 498.

In one embodiment, the health index of a component of an infrastructure is computed as a mathematical function of one or more of: the structured data of that component, the infrastructure data of that infrastructure and the unstructured data of that component. In one embodiment, a health index of the component is calculated analytically based on the structured data or simulated based on, for example, an average system availability over 10 years' planning horizon subject to different maintenance intervention and a budget constraint.

In one embodiment, the health index represents a hazard function by a maximum likelihood using failure and maintenance records, e.g., the health index (HI) is calculated according to: $HI=-(F \times R+W) \times 1$, wherein the F represents a vector representing failure probabilities of one or more components in the infrastructure, R represents a spatial correlation value of those components and the W represents a time elapsed since a last maintenance of the component, and 1 represents a vector of ones (this corresponds to summation of health indices of the components). For example, $F=\int_0^\tau h(t)dt$, $h(t)=\lambda\exp(\Sigma_{i=1}^k \beta_i Z_i)$, and $\lambda=0.001064$. Note that $\lambda$ can be any positive real number.

| Significant factors | β |
|---|---|
| age | −0.0198 |
| diameter | 0.1490 |
| length | −0.2374 |

| Significant factors | β |
| --- | --- |
| number of previous failures | 0.3752 |
| temperature | −0.0148 |

$Z_i$ is a covariate included in the formula $h(t)=\lambda \exp(\Sigma_{i=1}^{k} \beta_i Z_i)$, e.g. an age of pipes, a length of pipes, etc. The "age" represents an age of the infrastructure, for example, an age of the pipes. The "diameter" represents, for example, a diameter of the pipes. The "length" represents, for example, a length of the pipes. The number of previous failures represents the number of failures observed up to a current time period. The temperature represents, for example, temperature of contents flowing through the pipes.

In one embodiment, the health index calculator 135 computes a health index of a component of an infrastructure, e.g., by running the statistical and optimization modeler 110 with the structured data 400, the infrastructure data 450 and unstructured data 335 associated with component of the infrastructure. Based on the outputted health index, the short-term planning module 160 and the long-term planning module 165 establish one or more maintenance plans of the infrastructure, e.g., running method steps in FIGS. 2-6. An established plan specifies one or more of: a subset of components, a timing, an intervention action(s), and a resource requirement. The subset of components represents parts that need an inspection or repair. The timing represents when the inspection or repair is performed. The intervention action(s) represent action(s) that can be taken to perform the inspection or repair. The resource requirement represents materials and equipment (e.g., tool, manpower, etc.) needed to perform the inspection or repair.

In one embodiment, each established maintenance plan is associated with at least one health index. A comparator 180 compares the health indices of the one or more established maintenance plans. A selector 185 selects a plan, among the one or more established maintenance plans, whose health index is a maximum among the compared health index.

In one embodiment, the long-term planning module 165 runs method steps described in FIG. 2 to determine one or more long-term maintenance plans of one or more components of an infrastructure. At step 200, the computing system (e.g., the computing system 900 shown in FIG. 10) invokes the long-term planning module 165. The long-term planning module 165 communicates with the data collection module 105 to retrieve data (e.g., the structured data, unstructured data and/or infrastructure data) from a database 255. At step 210, the long-term planning module 165 invokes the health index calculation module 135 to calculate or update the health index of the one or more components. At step 220, the long-term planning module 165 invokes a resource and constraints management module 140 to determine and update a constraint associated with the one more components. The constraint includes one or more of: an availability of spare parts, labor cost, cost of the spare parts, equipment cost, an availability of labor, a traffic condition, a weather condition, a safety condition, an availability of equipment, and a population density. The resource and constraints management module 140 determines at least one constraint associated with performing maintenance of the one or more components of the infrastructure, e.g., based on spare parts availability and deliverability, expert knowledge, engineering experience, the unstructured data, workforce skills, availability and cost of workforce, and other conditions (e.g., weather, safety etc.).

Figure 5:
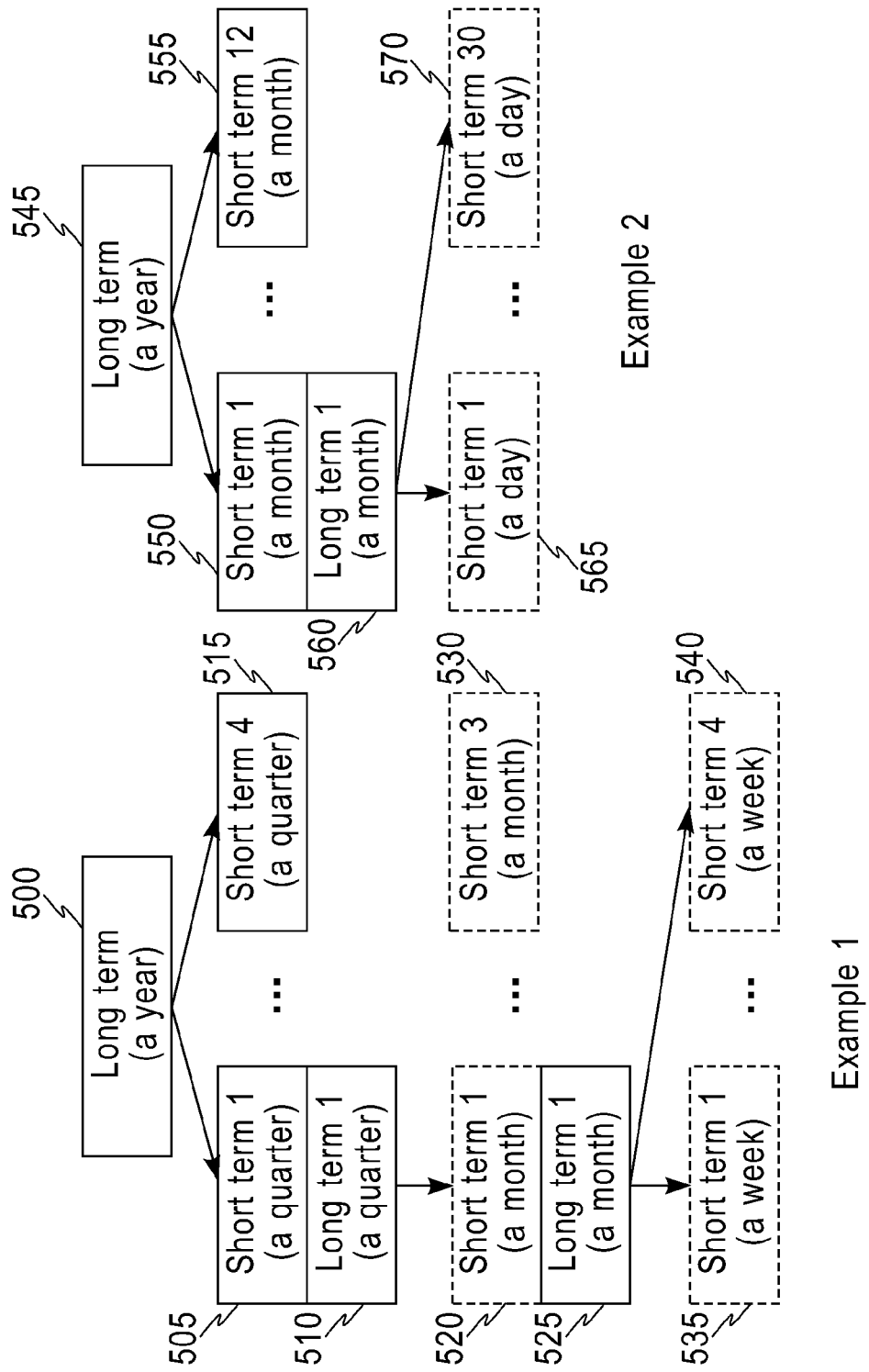
FIG. 5 illustrates a process of creating a long term plan in one embodiment.

At step 215, the long-term planning module 165 determines a long-term maintenance plan associated with the infrastructure, based on the calculated health index of components in the infrastructure and the determined constraint. "k" in the step 215 in FIG. 2 represents a term or level of a long-term plan. The long-term planning module 165 increments "k" after step 225, when a next-level long-term plan is needed. Step 225 is described in detail below. A long-term maintenance plan can determined, e.g., by combining pre-determined short-term maintenance plans of the infrastructure. As shown in an example 1 of FIG. 5, a long-term maintenance plan can be divided into multi-level short-term maintenance plans. For example, a yearly long-term maintenance plan 500 includes multiple quarterly short-term maintenance plans 505 and 515. A quarterly short-term maintenance plan is equal to a quarterly long-term maintenance plan 510. A quarterly long-term maintenance plan 510 includes multiple monthly short-term maintenance plans 520 and 530. A monthly short-term maintenance plan is equal to a monthly long-term maintenance plan 525. A monthly long-term maintenance plan 525 includes multiple weekly short-term maintenance plans 535 and 540. Example 2 of FIG. 5 illustrates that a yearly long-term maintenance plan 545 includes multiple monthly maintenance plans 550, 555 and 560 and a plurality of daily short-term maintenance plans 565-570.

In one embodiment, returning to FIG. 1, the long-term planning module 165 receives pre-determined short-term maintenance plans, information of a current situation of the infrastructure, cost parameters associated with the pre-determined short-term maintenance plans, the calculated health index, and the determined constraints. An example of the current situation of the infrastructure includes, but is not limited to: a current health index of the infrastructure. The long-term planning module 165 determines a long-term maintenance plan, e.g., by combining the pre-determined short-term plans based on the determined constraints and the calculated health index. The determined long-term maintenance plan specifies a group of components to maintain in each short term. An output of the long-term planning module 165 is a part of an input for generating the next-level long-term maintenance plan. In one embodiment, the nonlinear optimizer 120 can maximize an overall improvement of health indices of the one or more components of the infrastructure over a period, subject to budgeting and other possible resource or operational constraints. The nonlinear optimizer 120 may take into account both proactive and reactive spending and solve a combinatorial problem using a known heuristic algorithm (e.g., a known simulated annealing algorithm) to maximize an overall improvement of the health indices, e.g., according to $\max(\Delta HI/T)$, where $T \in (0,\infty)$ such that $c(x) \leq 0$ and $ceq(x)=0$, where T is given by a user, and $c(x)$ is a nonlinear inequality constraint, for example, operations need to be completed before a certain date. $ceq(x)$ is a nonlinear equality constraint, e.g., all the budget items need to be accounted for.

Returning to FIG. 2, at step 225, the long-term planning module evaluates whether a next-level long-term maintenance plan needs to be established, e.g., based on a user's preference. If the next-level long-term maintenance plan is needed, the long-term planning module 165 determines the next-level long-term maintenance plan, e.g., by repeating steps 210-220 after updating the health indices and the constraints. A health index of a component of an infrastructure is updated, e.g., by re-calculating the health index after a repair or replacement of the component according to a prior long-term maintenance plan. A constraint associated with the component is also re-evaluated after performing the repair and replacement the component according to the prior long-term maintenance plan.

If, at step 225, the next-level long-term maintenance plan is not needed, then at step 230, the long-term planning module 165 invokes the contract cost estimation module 150. The contract cost estimation module 150 estimates a cost of the determined long-term maintenance plan, e.g., by adding a labor cost for the determined long-term maintenance plan and equipment and material cost for the determined long-term maintenance plan. In one embodiment, the contract cost estimation module 150 estimates a cost for performing a maintenance plan including cost of idle workforce, given a maintenance plan and a scenario tree associated with the maintenance plan. The contract cost estimation module 150 estimates a cost of a portfolio, e.g., by combining costs of multiple jobs or multiple maintenance plans. The contract cost estimation module 150 estimates a cost of each type of action including, but not limited to: a determined action (i.e., an action definitely implemented in a current short term) described in a current short-term maintenance plan and an undetermined action (i.e., an action that may be or may not be implemented in the next short term) described in the next short-term maintenance plan. The estimated cost for implementing the determined action includes, but is not limited to: labor cost, material cost, cost to secure supplies and labor for various undetermined action in the next short-term maintenance plan, cost to secure an availability of equipment and qualified labor to install the material, etc. The estimated cost for implementing the undetermined action is a random quantity depending on scenarios (e.g., a scenario 785 shown in FIG. 7) that can emerge upon an inspection after the implementation of the current short-term maintenance plan. For example, the scenario tree developer 145 may assign probabilities to various scenarios and then the contract cost estimation module 150 computes the expected cost of the undetermined action based on those probabilities.

Figure 8:
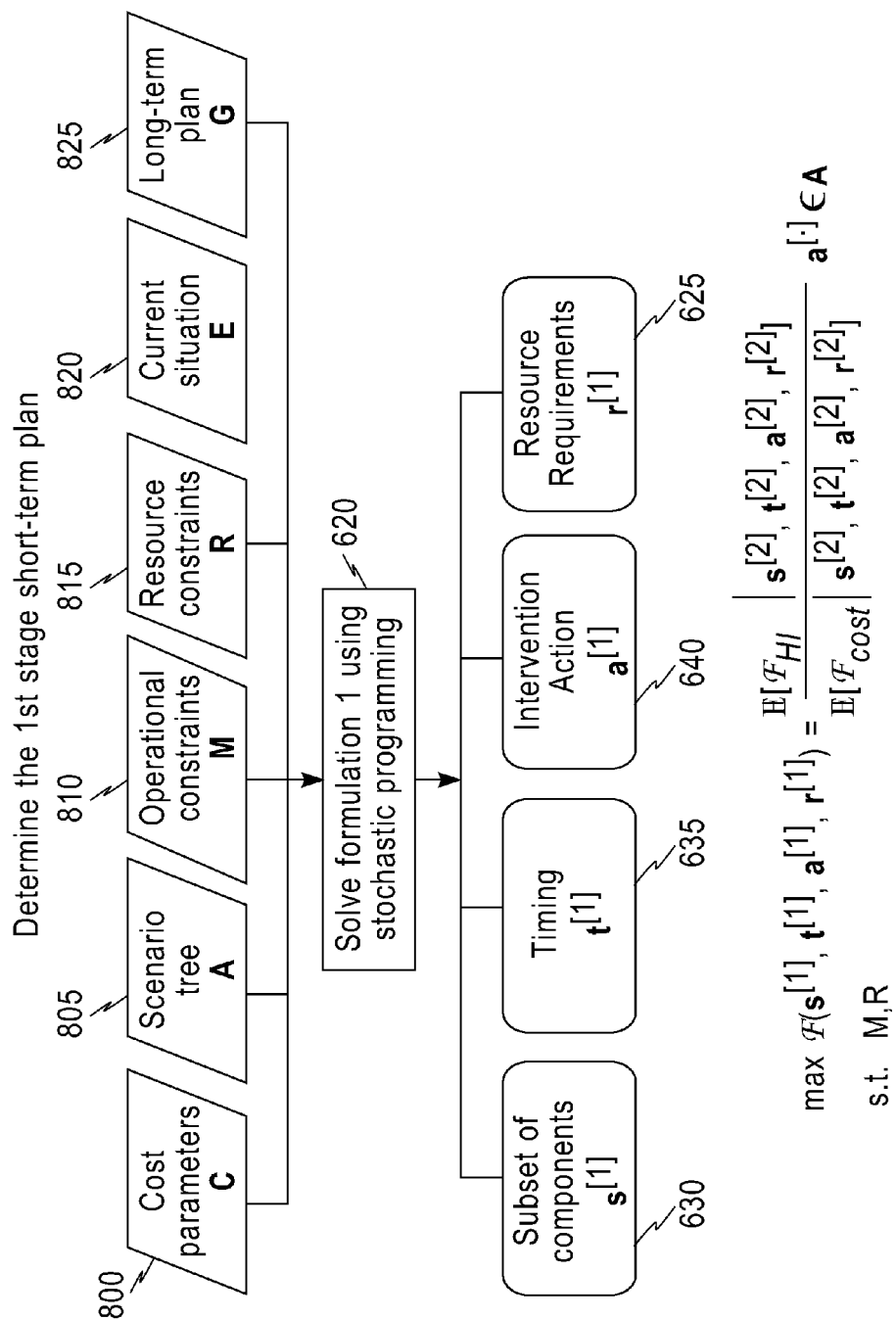
FIG. 8 illustrates a diagram for determining a first stage short term plan in one embodiment.

Returning to FIG. 2, at step 235, the long-term planning module 165 determines a first short-term maintenance plan associated with the infrastructure. FIG. 8 illustrates a diagram for determining the first short-term maintenance plan in one embodiment. As shown in a box 620 in FIG. 8, the computing system invokes the short-term planning module 160 that includes the stochastic optimizer 125. The short-term planning module 160 runs the stochastic optimizer 125 with cost parameters 800, a scenario tree 805, the determined constraint(s) 810-815, a current situation 820 associated with the infrastructure, the determined long-term plan 825, and the calculated health index. The scenario tree 805 describes all possible intervention actions under the calculated health index. Exemplary intervention actions include, but are not limited to: replacing a joint, replacing a pipe section, installing a circular clamp on a joint, installing a circular clamp on a pipe segment, replacing a particular type of joints from a particular manufacturer, etc. The determined constraints include operational constraints 810 (e.g., safety, weather, traffic condition, etc.) and resource constraints 815 (e.g., availability of spare parts, workforce, maintenance equipment, etc.). Cost parameters 800 include, but are not limited to: cost related to maintenance, direct and indirect damage cost, etc. The stochastic optimizer 125 outputs the first short-term maintenance plan that specifies one or more of: the subset 630 of the one or more components to be repaired or replaced according to the first short-term maintenance plan, a maintenance timing 635 or maintenance sequence of the subset 630 of the one or more components, at least one intervention action 640 needed to repair or replace the subset 635 of the one or more components, and a resource requirement 625 (e.g., labor, equipment, resource allocation, spare parts supply, workforce and equipments schedule, schedule for using the subset 630 of the one or more components, etc.).

Figure 7:
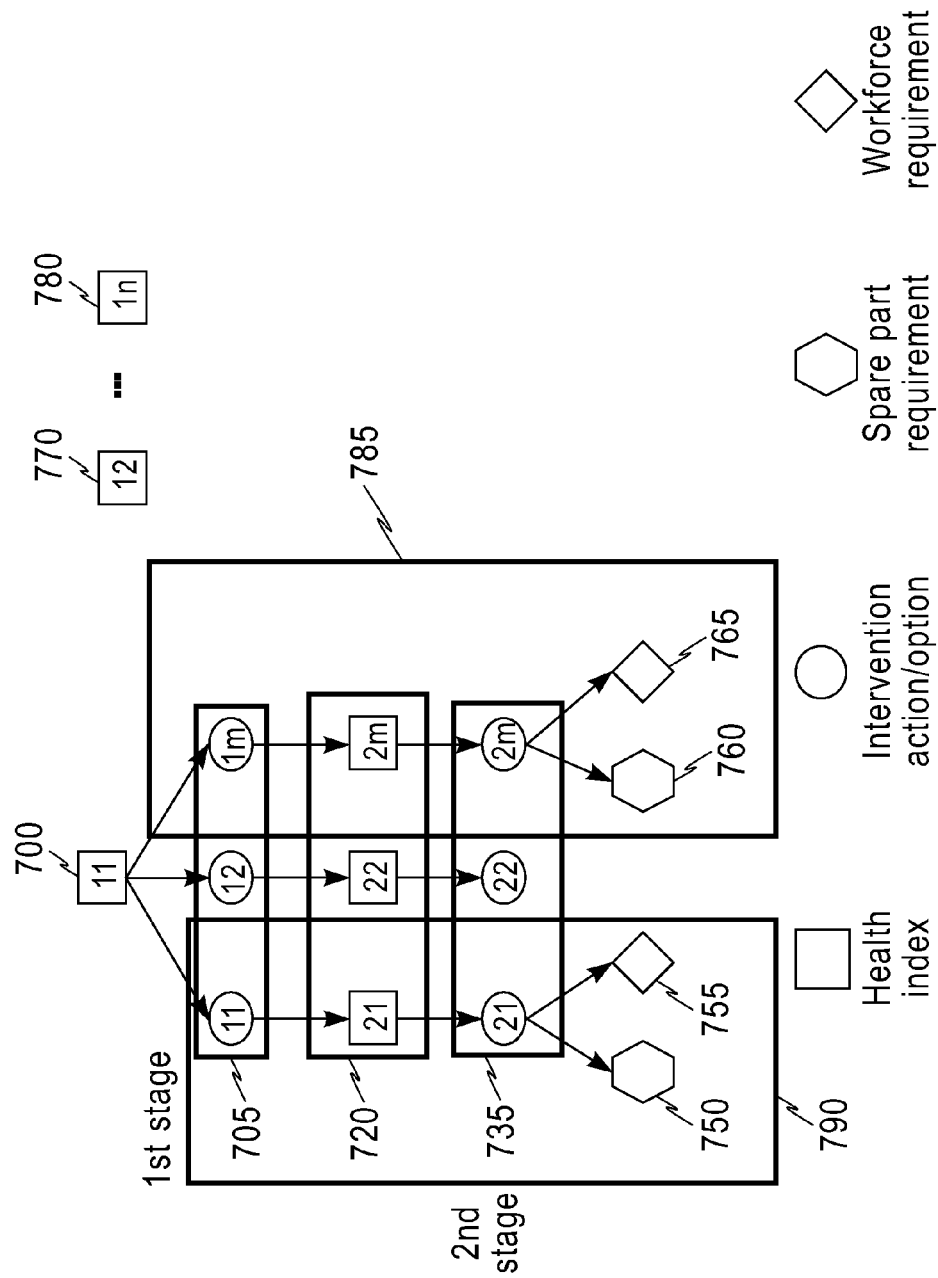
FIG. 7 illustrates an exemplary scenario tree in one embodiment.

FIG. 7 illustrates an exemplary scenario tree in one embodiment. A scenario tree includes a plurality of scenarios, e.g., a scenario 785 or 790. A scenario includes at least one determined action (e.g., action 11 or 12 or 1$m$) at the current short-term plan, health indices (e.g., health index 21 or 22 or 2$m$) re-calculated after implementing the determined action, undetermined actions (i.e., possible action 21, 22 or 2$m$) that can be taken under each re-calculated health index, and spare parts and workforce needed to implement each undetermined action. Each scenario is then evaluated in terms of risks it presents, impact on a corresponding maintenance plan and budgets, etc.

In one embodiment, a scenario tree lists intervention actions under the calculated health index. As shown in FIG. 7, an exemplary scenario tree 785 includes a plurality of nodes. A root node 700 in the scenario tree 785 represents the calculated health index. There may be a plurality of calculated health indices (e.g., health indices 770-780) at the root node 700. A first level 705 in the scenario tree includes at least one node representing at least one action (e.g., an action 11, 12, 1$m$, etc.) that can be taken under the calculated health index. The first level 705 and the root node 700 may be used to calculate the first short-term maintenance plan. A second level 720 of the scenario tree 785 includes at least one node representing a health index (e.g., a health index 21, 22, 2$m$ etc.) calculated after an action at the first level of the scenario tree is performed. A third level 735 of the scenario tree 785 includes at least one node representing at least one action (e.g., an action 21, 22 and 2$m$, etc.) that can be taken under the health index at the second level 720 of the scenario tree. Leaf nodes (e.g., nodes 750, 755, 760 and 765) in the scenario tree 785 represent spare parts and workforce needed to perform an action described in a corresponding parent node.

In one embodiment, the scenario tree developer module 145 creates the scenario tree associated with the one or more components in the infrastructure. Whenever a long-term or short-term maintenance plan is needed, the scenario tree developer module 145 uses the up to date information (e.g., inspection results, etc.) to construct the scenario tree for one or more components. To create a scenario tree, the scenario tree developer module 145 lists all the possible health indices, intervention actions, spare parts and workforce requirement and represents these information (e.g., health indices, intervention actions, etc.) in a tree data structure as shown in FIG. 7 based on a likelihood of each possible maintenance plan at each stage (i.e., each short term). A probability value may be associated with each node in the scenario tree, and an expected cost may be associated with each intervention option. A simulation of implementing each possible maintenance plan may be conducted to evaluate a corresponding health index given the possible maintenance plan and to evaluate a potential improvement of the corresponding health index after implementing the possible maintenance plan.

Returning to FIG. 2, at step 240, the long-term planning module 165 invokes a job scheduling and contract generation module 155 in one embodiment. The job scheduling and contract generation module 155 provides a list of actions to be implemented according to short-term maintenance plan(s) and develops a schedule for the implementation of these actions. The schedule takes into account local and seasonal conditions, an availability of labor and equipment, other project coordination and other constraints. For example, if it is known that certain activities are preplanned by a maintenance organization, the job scheduling and contract generation module 150 may generate the schedule that initiates the actions right after those activities are completed. The job scheduling and contract generation module 155 generates a work schedule and work contract based on the determined first short-term maintenance plan. The generated work schedule specifies one or more of: a list of components to inspect or repair, actions to be taken to inspect or repair the components in the list, an estimated time to conduct the inspection or repair, an estimated time that the inspection or repair is completed, required materials and equipments to perform the inspection or repair. The generated work contract specifies one or more of: what type of skilled workers (e.g., technicians, plumbers, electricians, carpenters, engineers, etc.) are needed to perform the inspection or repair, an estimation of a number of work hours needed per each type of skilled workers until the inspection or repair is completed, a labor cost per each skilled worker needed, additional cost associated with the undetermined action, an estimated cost to perform an initial investigation, at least one determined part (e.g., a part that is needed to implement the determined action), at least one determined material (e.g., a material that is needed to implement the determined action), determined labor (e.g., labor that is needed to implement the determined action), the inspection, and at least one undetermined part. The undetermined part includes, but not limited to: securing at least one material, e.g., water pipes on 24-hour supply basis, in case these material are needed, securing skilled workers, e.g., on 6-hour basis, involving pre-determined skills, options on additional payment in case skilled workers involved in the undetermined part are needed in the undetermined part, and severance payment in case no work is required in the undetermined part. The job scheduling and contract generation module 155 may also initiate ordering of spare parts needed to implement the first short-term maintenance plan.

According to the determined first short-term maintenance plan, the job schedule and contract generation module 155 produces specific instructions for working crews. For example, the produced specific instructions may describe that 5 people working with a bulldozer come to a certain point in a town, dig up a street, disconnect a pump and wait for an inspector and further instructions. The job schedule and contract generation module 155 may also send a message or notification, e.g., via an instance messaging, twitter®, email, etc., to a supplier to ensure the delivery of necessary spare parts, e.g., request to deliver ten 20" pipes by a certain date.

Returning to FIG. 2, at step 245, the long-term planning module 165 sends a notification or a message (e.g., an email, an instant message, a text, etc.) to users or an entity to let the users or the entity perform an action, among the intervention actions, specified in the determined first short-term maintenance plan. After performing the specified action, the users or the entity inspect places where the action is performed. After the users completing the inspection, the long-term planning module 165 invokes the resource and constraints management module 140 to update the determined constraint based on the performed specified action and the inspection. The long-term planning module 165 also invokes the health index calculation module 135 to re-calculate the health index of the one or more components in the infrastructure after performing the specified action. The long-term planning module 165 stores the updated constraint and re-calculated health index in the database 255.

Figure 9:
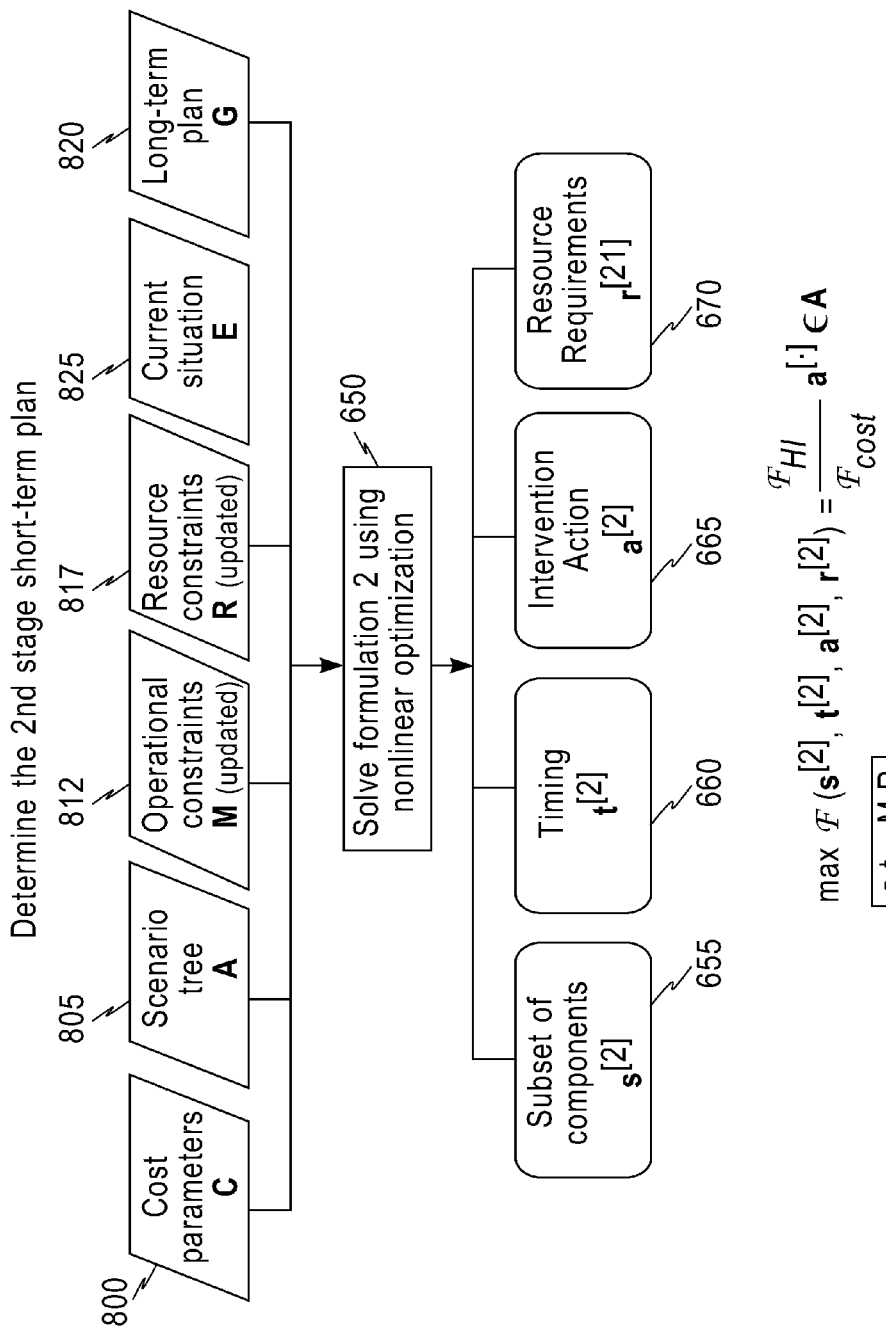
FIG. 9 illustrates a diagram for determining a second stage short term plan in one embodiment.

At step 250, the long-term planning module 165 determines a second short-term maintenance plan after performing the specified action according to the determined first short-term maintenance plan. FIG. 9 illustrates a diagram for determining the second short-term maintenance plan in one embodiment. To determine the second short-term maintenance plan, the short-term planning module 160 runs the nonlinear optimizer 120 with the cost parameters 800, the scenario tree 805, the re-calculated health index, the updated constraints 812-817, the current situation 825 associated with the infrastructure, and the determined first long-term plan (not shown). The nonlinear optimizer 120 outputs the second short-term maintenance plan. The outputted second short-term maintenance plan specifies one or more of: the subset 655 of the one or more components to be repaired or replaced according to the second short-term maintenance plan, a maintenance timing 660 or maintenance sequence to repair or replace the subset 655 of the one or more components, at least one intervention action 665 needed to repair or replace the subset 655 of the one or more components, and a resource requirement(s) 670 (e.g., labor, equipment, resource allocation, spare parts supply, workforce and equipments schedule, schedule for using the subset 655 of the one or more components, etc.).

The second short-term maintenance plan may further describe all the possible intervention actions to be applied to the subset 655 of the one or more components at the second short term. The second short-term maintenance plan may also describe a probability of an implementation of each intervention action at the second short term. The second short-term maintenance plan may further describe a resource requirement, operational constraints, cost, and improvement of the health index of each intervention action. The long-term planning module 165 may invoke the job scheduling and contract generation module 155 to generate work schedules and work contracts associated with the determined second short-term maintenance plan, just as that the job scheduling and contract generation module 155 generates the work schedules and work contracts associated with the determined first short-term maintenance plan. Returning to FIG. 2, after determining the second short-term maintenance plan, the long-term planning module 165 repeats the steps 240-250. The job scheduling and contract generation module 155 may also order spare parts needed to implement the second short-term maintenance plan.

In one embodiment, as shown in FIG. 8, to determine the first short-term maintenance plan, the stochastic optimizer 125 solves $$\max F(s^{[1]}, t^{[1]}, a^{[1]}, r^{[1]}) = \frac{E[F_{HI}|s^{[2]}, t^{[2]}, a^{[2]}, r^{[2]}]}{E[F_{cost}|s^{[2]}, t^{[2]}, a^{[2]}, r^{[2]}]},$$

$a^{[\cdot]} \in A$, where $s^{[1]}$ is a value that represents the subset 630 of the one or more components, $t^{[1]}$ is a value that represents the timing 635 of maintenances of the subset 630 of the components, $a^{[1]}$ is a value that represents the intervention actions 640, the $r^{[1]}$ is a value that represents the resource requirement 625, and A represents a set of all possible interventions actions. The stochastic optimizer 125 attempts to maximize these values $s^{[1]}$, $t^{[1]}$, $a^{[1]}$, and $r^{[1]}$, e.g., by solving $$\frac{E[F_{HI}|s^{[2]}, t^{[2]}, a^{[2]}, r^{[2]}]}{E[F_{cost}|s^{[2]}, t^{[2]}, a^{[2]}, r^{[2]}]}.$$

$F_{HI}$ refers to a mathematical formula for calculating a health index whose components include, but not limited to: $s^{[2]}$, $t^{[2]}$, $a^{[2]}$, $r^{[2]}$. As shown in FIG. 9, $s^{[2]}$ is a value that represents the subset 655 of the one or more components which will be repair or replaced in a second short-term maintenance plan. $t^{[2]}$ is a value that represents maintenance timing 660 or maintenance sequence of the subset 655 of the one or more components according to the second short-term maintenance plan, $a^{[2]}$ is a value that represents the intervention actions 665 needed to repair or replace the subset 655 of the one or more components according to the second short-term maintenance plan, and $r^{[2]}$ is a value that represents the resource requirement 670 (e.g., labor, equipment, etc.) according to the second short-term maintenance plan. As shown in the box 650 in FIG. 9, to obtain $s^{[2]}, t^{[2]}, a^{[2]}, r^{[2]}$, the nonlinear optimizer 120 solves $$\max F(s^{[2]}, t^{[2]}, a^{[2]}, r^{[2]}) = \frac{F_{HI}}{F_{cost}}.$$

In other words, the nonlinear optimizer 120 seeks values of $s^{[2]}, t^{[2]}, a^{[2]}, r^{[2]}$ that maximizes a result of $$\frac{\text{health index of the second short-term maintenance plan}}{\text{Cost of the second short-term maintenance plan}}.$$

FIG. 6 is a flow chart that describes method steps for determining the first and second short-term maintenance plans in one embodiment. At step 600, the short-term planning module 160 invokes a data query module 610 to retrieve data stored in a database 615 including one or more of: the determined long-term maintenance plan 820, the current situation 820, the scenario tree 805, health indices 608 of the one or more components, constraints 609 associated with the one or more components, etc. In one embodiment, these data are represented in one or more standard data structures (e.g., a list, vector, string, etc.) The short-term planning module 160 runs the stochastic optimizer 125 with the one or more data structures representing the determined long-term plan 820, the current situation 820, the scenario tree 805, the health indices 608, the constraints 609 and cost of social loss due to possible maintenances of the one or more components. The stochastic optimizer 125 computes and outputs, in a format of a text file, a table, a list, etc., the first short-term maintenance plan that specifies the subset 630 of the one or more components to be repaired or replaced in the first short term, the maintenance timing 635, the intervention action 640 needed to repair or replace the subset 630 of the one or more components, and the resource requirement 625 (e.g., spare parts and workforce requirements).

At step 645 in FIG. 6, users implement the first short-term maintenance plan, e.g., by repairing or replacing components according to the first short-term maintenance plan. The short-term planning module 160 acquires an inspection result of the repaired components and their surrounding components. Then, the health index calculation module 135 updates health indices of the repaired components and their surrounding components, e.g., re-calculating the health indices of the repaired components and their surrounding components. The scenario tree developer module 145 updates the scenario tree 805 based on the re-calculated health indices, e.g., by reassessing possible intervention actions under the re-calculated health indices. The resource and constraints management module 140 then reassesses the constraints 609 associated with the one or more components after implementing the first short-term maintenance plan. In one embodiment, the re-calculated health indices, the updated scenario tree, the cost of social loss due to possible intervention actions at the second short term and the updated constraints are represented in one or more standard data structures (e.g., a list, vector, string, etc.) and are stored in the database 615.

At step 650, the short-term planning module 160 runs the nonlinear optimizer 120 with the standard data structure(s) (e.g., a list, vector, string, etc.) representing the re-calculated health indices, the updated scenario tree, the cost of social loss due to possible intervention actions at the second short term and the updated constraints. The nonlinear optimizer 120 computes and outputs, in a format of a text file, a list, a table, etc., the second short-term maintenance plan. The outputted second short-term maintenance plan specifies one or more of: the subset 655 of the one or more components to be repaired or replaced according to the second short-term maintenance plan, the maintenance timing 660 or maintenance sequence to repair or replace the subset 655 of the one or more components, the intervention action 665 needed to repair or replace the subset 655 of the one or more components, and the resource requirement 670 (e.g., labor, equipment, resource allocation, spare parts supply, workforce and equipments schedule, schedule for using the subset 655 of the one or more components, etc.).

Figure 10:
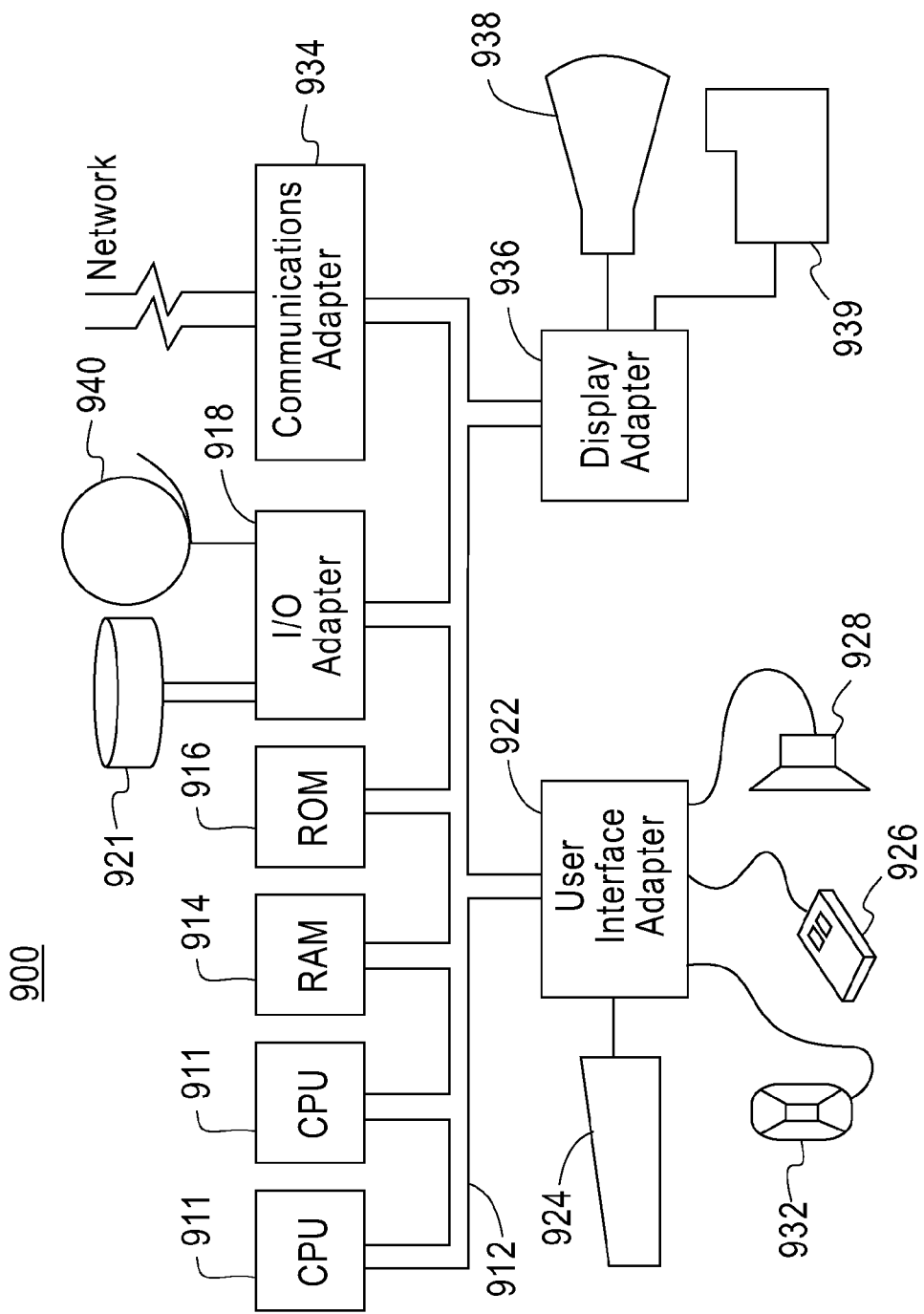
FIG. 10 illustrates an exemplary hardware configuration for performing method steps of the flow chart illustrated in FIG. 2 in one embodiment.

FIG. 10 illustrates an exemplary hardware configuration of the computing system 900. In one embodiment, the modules 135-165, the user interface 170, the data collection 105 and the statistical and optimization modeler 110 are implemented in the computing system 900. The hardware configuration preferably has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting the system 900 to a data processing network, the Internet, an Intranet, a local area network (LAN), etc., and a display adapter 936 for connecting the bus 912 to a display device 938 and/or printer 939 (e.g., a digital printer of the like).

By running the method steps in FIGS. 2 and 6, the long-term planning module 165 and the short-term planning module 160 predict possible failures of components in an infrastructure, e.g., by calculating a health index of the component and generates the long-term maintenance plans and short-term maintenance plans. The long-term or short-term maintenance plans may be proactive maintenance plans (i.e., plans taken before damage occurs on the infrastructure) or reactive maintenance plans (i.e., plans taken after damage occurs on the infrastructure). As shown in FIG. 4, the health index calculation module 135 produces the health index, e.g., by using the structured data 410, the infrastructure data 450, and the unstructured data 490. The long-term maintenance plans and the short-term maintenance plans add additional decision points to calculate the health index. Examples of these additional decision points to calculate the health index include, but are not limited to: after implementation of a short-term maintenance plan, and after performing an inspection. Among diverse long-term and short-term maintenance plans, the computing system selects a maintenance plan that maximize an improvement of an infrastructure health with a minimal cost of social loss, e.g., by selecting a maintenance plan whose health index is the maximum.

The job scheduling and contract generation module 155 automatically generates a document, according to the selected plan, which specifies at least one determined action (e.g., an intervention action specified in a current short-term maintenance plan) and at least one undetermined action (e.g., an intervention action specified in a next short-term maintenance plan). The determined action includes, but is not limited: an action that is definitely implemented in a current short term. The undetermined action is an action that may be or may not be implemented in a next short term. Users or an entity implement(s) the determined action in a current short term. After implementing the determined action, the health index calculation module 135 re-calculates the health index of one or more component associated with the implemented determined action, e.g., by calculating HI=−(F×R+W)×1, wherein the F represents a vector representing failure probabilities of the one or more components, R represents a spatial correlation value of those components, the W represents a time elapsed since a last maintenance of those components, and 1 represents a vector of ones. The comparator 180 compares the re-calculated health index against a pre-determined threshold. Based on a result of the comparison, the job scheduling and contract generation module 155 determines whether to implement the undetermined action or not. For example, if the re-calculated health index is larger than the pre-determined threshold, the job scheduling and contract generation module 155 notifies the users or the entity to implement the undetermined action, e.g., by sending an email, text, instant message, etc. By running method steps in FIGS. 2 and 6, the computing system facilitates a decision-making and maintenance management tasks.

In one embodiment, there is provided a statistical model to estimate a health index of a component of an infrastructure. The statistical model reflects a historical data (i.e., prior maintenance records) and data of similar assets in other cities. An example of the statistical model includes, but not limited to: HI (health index) representing a spatial correlation of components failed and repair history=−(F×R+W)×1, wherein the F represents a vector representing failure probabilities of components in the infrastructure, R represents a spatial correlation of those components and the W represents a time elapsed since a last maintenance of the component, and 1 represents a vector of ones (this corresponds to summation of health indices of the components; e.g., [1 1 1 1 ... 1 1 1 1]. For example, the health index calculation module 135 calculates this formula "−(F×R+W)×1" as follows:

$F_i$ is the failure probability of a component at a given time that can be computed as follows $$F = \int_0^\tau h(t)dt$$

$$h(t) = \lambda \exp\left(\sum_{i=1}^k \beta_i Z_i\right)$$

$$\lambda = 0.001064$$

$Z_1$ is an age of pipes
$Z_2$ is an diameter of pipes
$Z_3$ is a length of pipes
1 is a vector of ones (this corresponds to summation of component health indices).
Using a known regression technique (e.g., a linear regression, Cox regression, etc.), the health index calculation module 135 obtains the estimate of parameters for h(t), for example, $\lambda$=0.001064, $\beta_1$=−0.00198, $\beta_2$=0.1490, $\beta_3$=−0.2374.

Suppose $\tau$=3.5 year, health index calculation module 135 can obtain the value of F for each component.
Then, the health index calculation module 135 can calculate the distance (d) of each two components based on, for example, Euclidean distance.
Given a parameter $\sigma$, the health index calculation module 135 can construct a spatial correlation matrix ($\Sigma$) and obtain $R_i$
Then, based on the maintenance history record in the database 255, suppose that the maintenance history record indicates that a particular pipe has been repaired 1.5 year ago. Then, health index calculation module 135 can compute a normalized elapsed time since a last maintenance W=1.5/100.

Figure 11:
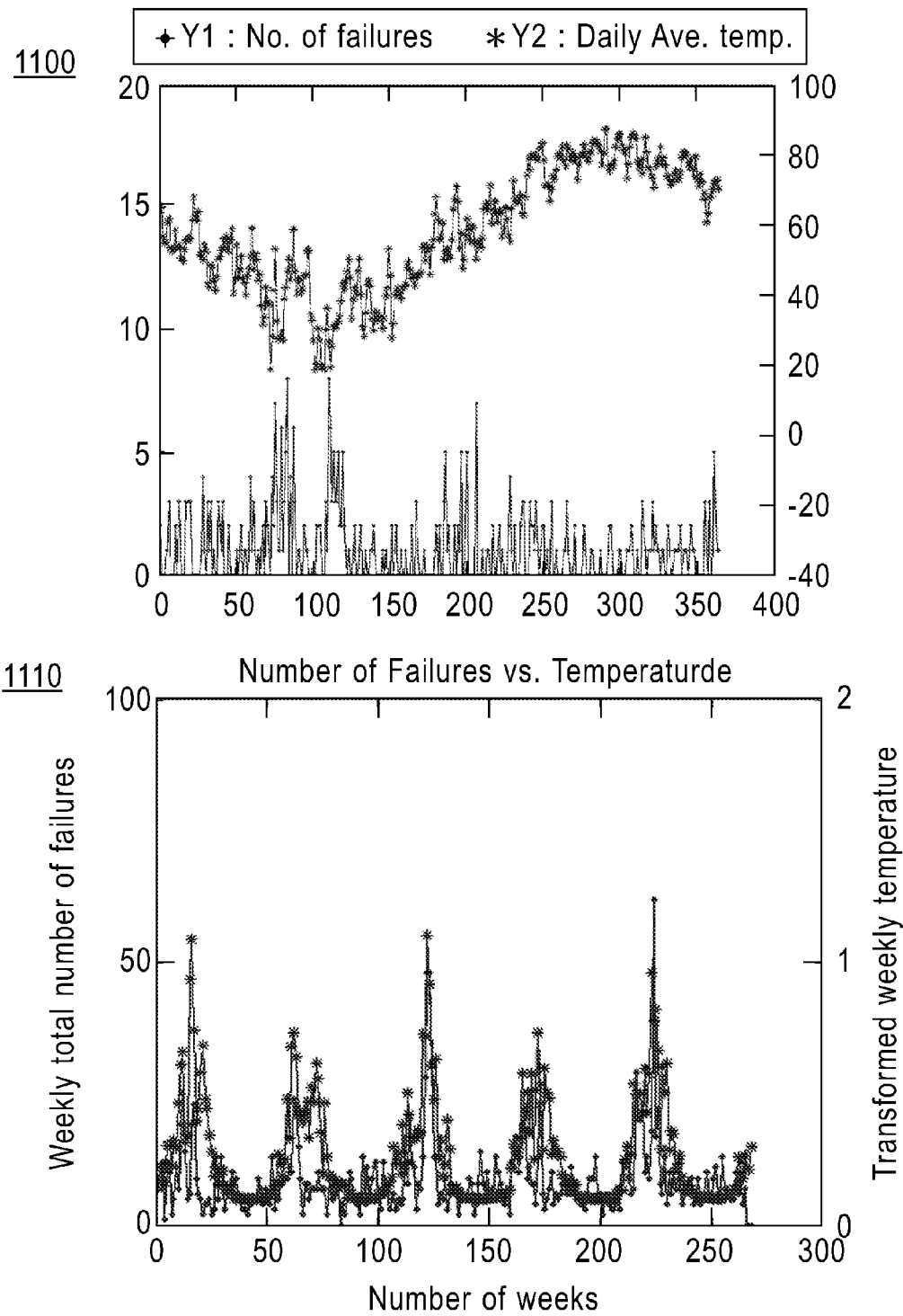
FIG. 11 illustrates exemplary graphs that air temperatures are related to the number of failures of water pipes in one embodiment.
Figure 12:
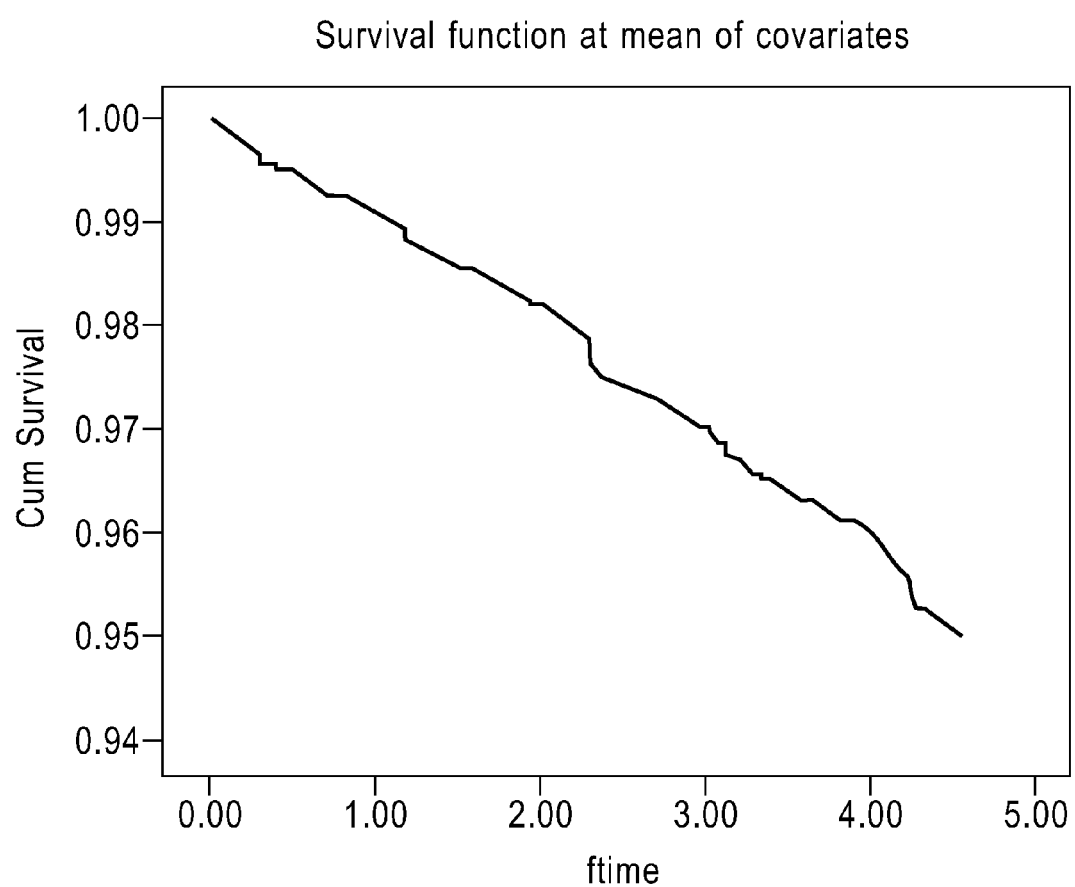
FIG. 12 illustrates an exemplary health index of a component calculated by a formula in one embodiment.

In one embodiment, the computing system computes the health index based on non-stationary operating conditions, environment information, maintenance records and unstructured data, e.g., by computing a proportional intensity function $\lambda(t)$ (which is a formula to compute a health index representing a failure likelihood which may be impacted by non-stationary factors)=$\lambda_0 \exp[\beta_1 z_1(t)+\beta_2 z_2]$=$\lambda_0(t)\exp[\beta_1 z_1(t)]\times\exp(\beta_2 z_2)$, where the proportional intensity function predicts a rate of occurrences of failures and derives following statistics including, but not limited to: a probability of a failure of a component (failure likelihood), a reliability of the component in $\tau$ time, a hazard rate of the component in $\tau$ time, a mean time to a failure (MTTF) of the component, a mean time between failures (MTBF) of the component, a mean residual life (MRL) of the component, etc. Stationary factors (e.g., "$\beta_2 z_2$") include, but are not limited to: a water pipe diameter, a material length, a material roughness, a mean age of components in an infrastructure, a minimum roughness of components in the infrastructure, a maximum roughness of components in the infrastructure, a maximum diameter of components in the infrastructure, a mean diameter of the components in the infrastructure, a maximum length of the components in the infrastructure, a mean length of the components in the infrastructure, materials composing the components, a log number of previous failures, etc. Non-stationary factors (e.g., "$\beta_1 z_1(t)$") include, but are not limited to: air temperature, water temperature, water pressure, pipe age, the number of previous failures, etc. FIG. 11 illustrates two graphs that show that air temperatures are correlated to the number of failures of mains. For example, a graph 1100 in FIG. 11 shows that the colder weather, the more failures in the mains. A graph 1110 in FIG. 11 shows a correlation of air temperature with the number of observed failures in mains. Baseline ("k") may be in the form of $\alpha t^\tau$, for example, $\alpha$=2.29$e^{-0.07}$, $\tau$=0.138, and t is a variable representing a time period. In one embodiment, these parameters (e.g., $\lambda_0$, $\beta_1$, $\beta_2$, etc.) are estimated, e.g., by using maximum likelihood estimation technique. Addie Andromeda Evans, "Maximum Likelihood Estimation," 2008, San Francisco State University, wholly incorporated by reference as if set forth herein, describes the maximum likelihood estimation in detail. By computing $\lambda(t)$=$\lambda_0 \exp[\beta_1 z_1(t)+\beta_2 z_2]$, the computing system can obtain a health index for every location of an infrastructure at any time. FIG. 12 illustrates exemplary output of this formula, $\lambda(t)$=$\lambda_0 \exp[\beta_1 z_1(t)+\beta_2 z_2]$, that represent a failure probability of a certain component of an infrastructure, for example, pipes. FIG. 12 indicates that a probability of a pipe surviving 3 years is 97%.

By analyzing the prior maintenance history and unstructured data, the computing system may be able to identify spare parts made from a particular manufacture and materials from a particular supplier have higher frequencies of failures than others. The long-term planning module 165 and the short-term planning module 160 use these analyzed prior maintenance history and unstructured data when ordering spare parts and determining constraints of resource requirements in both long-term and short-term maintenance plans.

In one embodiment, the health index calculation module 135 recalculates health indices of component(s) in response to an inspection, diagnostic tests and repairs of those component(s). By computing or recalculating health indices of components in an infrastructure, the computing system can identify a cluster of components in the infrastructure which has the lowest health index.

In one embodiment, the planning modules 160-165 consider a failure probability of a component in an infrastructure and a spatial correlation of the component and other components, e.g., by computing $F_i \times R_i$ when determining at least one maintenance plan. $F_i$ represents the failure probability or expected number of failures of the component in a planning interval. $R_i$ represents the spatial correlation of the component and other components. For example, $R_i$ is $\Sigma^{1/2}$, where $\Sigma = \exp(-d/\sigma)$, where $\sigma$ is a distance contraction parameter, and d is a distance between two components. By computing $F_i \times R_i$, the computing system determines an urgency of an inspection of the component according to a resulting value of $F_i \times R_i$. According to the determined urgency, users inspect one or more components and their surrounding components.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for maintaining an infrastructure of components, the method comprising:
    receiving, by a processor device, structured data, unstructured data, and infrastructure data from a database;
    running, by said processor device, at least one statistical and optimization modeler with one or more of: the received structured data, the received unstructured data and the received infrastructure data, in order to calculate a health index of at least one component of the infrastructure, the health index representing a health attribute of the at least one component, the calculation of the health index of the at least one component of the infrastructure including:

HI (health index)$=-(F \times R+W) \times 1$, where F is a vector representing failure probabilities of the at least one component in the infrastructure, R represents a spatial correlation value of the at least one component and the W represents a time elapsed since a last maintenance of the at least one component, and 1 represents a vector of ones, wherein the vector F is a function of $\lambda \exp(\Sigma_{i=1}^{k}\beta_i Z_i)$, where $\lambda$ is any positive real number, $Z_i$ is a covariate, i is an index, k is a maximum number of the index, and $\beta_i$ is a variable representing one or more of: an age of the at least one component, a diameter of the at least one component, a length of the at least one component, a number of previous failures of the at least one component;

establishing at least one maintenance plan of the infrastructure, based on the calculated health index, each established maintenance plan being associated with at least one health index;

comparing health indices of the at least one established maintenance plan; and selecting a plan, among the at least one established maintenance plan, whose health index is a maximum among the compared health indices, wherein a computing system including at least one memory device and said processor device performs the establishing, the comparing, and the selecting.

2. The method according to claim 1, wherein the statistical and optimization modeler includes one or more of: a statistical modeler, a nonlinear optimizer, a stochastic optimizer, and a heuristic optimizer.

3. The method according to claim 2, wherein the established maintenance plan specifies one or more of: a subset of components, a timing, intervention actions, and a resource requirement, the subset of components representing parts that need an inspection or repair, the timing representing when the inspection or repair is performed, the intervention actions representing actions that can be taken to perform the inspection or repair, the resource requirement representing materials and equipment needed to perform the inspection or repair.

4. The method according to claim 3, further comprising:
specifying, according to the selected plan, at least one determined action and at least one undetermined action;
implementing the at least one determined action;
re-calculating the health index after the implementation of the at least one determined action;
comparing the re-calculated health index against a pre-determined threshold; and
determining whether to implement the at least one undetermined action based on the comparison.

5. The method according to claim 4, further comprising:
determining at least one constraint associated with performing maintenance of the infrastructure;
determining a long-term maintenance plan associated with the infrastructure, based on the calculated health index of components in the infrastructure and the determined constraint;
estimating a cost of the determined long-term maintenance plan;
determining a first short-term maintenance plan associated with the infrastructure, the determined first short-term maintenance plan specifying one or more of: the subset of components, the timing, the intervention actions, and the resource requirement;
performing an action, among the intervention actions, specified in the determined first short-term maintenance plan;
updating the determined constraint after performing the specified action;
re-calculating the health index of the components in the infrastructure after performing the specified action; and
repeating the step of determining the constraint, the step of determining the long-term maintenance plan, the step of estimating the cost, the step of determining the first short-term maintenance plan, the step of performing, the step of updating, and the step of re-calculating.

6. The method according to claim 5, wherein the constraint includes one or more of:
an availability of spare parts, labor cost, cost of the spare parts, equipment cost, an availability of labor, a traffic condition, a weather condition, a safety condition, an availability of equipment, and a population density.

7. The method according to claim 5, wherein the determining the long-term maintenance plan includes:
aggregating pre-determined short-term maintenance plans of the infrastructure, based on the determined constraint and the calculated health index, wherein the determined long-term maintenance plan specifies a group of components to maintain in each short-term.

8. The method according to claim 5, wherein the estimating the cost includes:
adding a labor cost for the determined long-term maintenance plan and equipment and material cost for the determined long-term maintenance plan.

9. The method according to claim 5, wherein the determining the first short-term maintenance plan includes:
running the stochastic optimizer with cost parameters, a scenario tree, the determined constraint, a current situation associated with the infrastructure, the calculated health index, and the determined long-term plan and outputting, from the stochastic optimizer, the first short-term maintenance plan.

10. The method according to claim 9, wherein the scenario tree lists the intervention actions under the calculated health index, the scenario tree including a plurality of nodes, a root node in the scenario tree representing the calculated health index, a first level in the scenario tree including at least one node representing at least one action that can be taken under the calculated health index, a second level of the scenario tree including at least one node representing a health index calculated after an action at the first level of the scenario tree is performed, a third level of the scenario tree including at least one node representing at least one action that can be taken under the health index at the second level of the scenario tree, a leaf node in the scenario tree representing spare parts and a workforce needed to perform an action or option described in a corresponding parent node.

11. The method according to claim 10, further comprising:
determining a second short-term maintenance plan after performing the action according to the determined first short-term maintenance plan; and
repeating the step of determining the first short-term maintenance plan, the step of performing the action, and the step of the determining the second short-term maintenance plan.

12. The method according to claim 11, wherein the step of determining the second short-term maintenance plan includes:

running the nonlinear optimizer with the cost parameters, the scenario tree, the re-calculated health index, the updated constraint, the current situation associated with the infrastructure, and the determined first long-term plan and outputting, from the nonlinear optimizer, the second short-term maintenance plan.

13. The method according to claim 5, wherein the step of specifying further comprises:
generating a work schedule and a work contract governing the intervention actions of workers that provide maintenances on the infrastructure based on the determined first short-term maintenance plan, the generated work schedule specifying one or more of: a list of components to inspect or repair, actions to be taken to inspect or repair the components in the list, an estimated time to conduct the inspection or repair, an estimated time that the inspection or repair is completed, required materials and equipments to perform the inspection or repair, the generated work contract specifying one or more of: types of skilled workers needed to perform the inspection or repair, an estimation of a number of work hours needed per each type of skilled workers until the inspection or repair is completed, a labor cost per each skilled worker needed, an additional cost associated with the at least one undetermined action, and an estimated cost to perform an initial investigation of the components in the list.

14. The method according to claim 1, wherein the structured data includes one or more of: a physical property of the component, an operational condition of the component, an environmental factor of the component, a maintenance history record of the component, parts and suppliers of the component, and a human activity associated with the component.

15. The method according to claim 1, wherein the infrastructure data includes one or more of: a service reliability of the infrastructure, an availability of the infrastructure, a status of deterioration of the infrastructure, an intervention history of the infrastructure, and an impact of a failure of the infrastructure.

16. The method according to claim 1, wherein the unstructured data includes one or more of: expert knowledge associated with the component, engineering knowledge associated with the component, equipment information of the component, manufacturer information of the component, an installation date of the component, and an operating condition of the component.

17. The method according to claim 1, wherein the health index is computed as a mathematical function of the structured data, the infrastructure data, and the unstructured data.

18. A system for maintaining an infrastructure of components, the system comprising: at least one memory device;
at least one processor connected to the memory device, wherein the processor is configured to:
receive structured data, unstructured data, and infrastructure data from a database; run at least one statistical and optimization modeler with one or more of: the received structured data, the received unstructured data and the received infrastructure data, in order to calculate a health index of at least one component of the infrastructure, the health index representing a health attribute of the at least one component, the calculation of the health index of the at least one component of the infrastructure including:
HI (health index)$=-(F \times R + W) \times 1$, where F is a vector representing failure probabilities of the at least one component in the infrastructure, R represents a spatial correlation value of the at least one component and the W represents a time elapsed since a last maintenance of the at least one component, and 1 represents a vector of ones, wherein the vector F is a function of $\lambda \exp(\Sigma_{i=1}^{k} \beta_i Z_i)$, where $\lambda$ is any positive real number, $Z_i$ is a covariate, i is an index, k is a maximum number of the index, and $\beta_i$ is a variable representing one or more of: an age of the at least one component, a diameter of the at least one component, a length of the at least one component, a number of previous failures of the at least one component;
establish at least one maintenance plan of the infrastructure, based on the calculated health index, each established maintenance plan being associated with at least one health index; compare health indices of the at least one established maintenance plan; and
select a plan, among the at least one established maintenance plan, whose health index is a maximum among the compared health indices.

19. The system according to claim 18, wherein the statistical and optimization modeler includes one or more of: a statistical modeler, a nonlinear optimizer, a stochastic optimizer, and a heuristic optimizer.

20. The system according to claim 19, wherein the established maintenance plan specifies one or more of: a subset of components, a timing, intervention actions, and a resource requirement, the subset of components representing parts that need an inspection or repair, the timing representing when the inspection or repair is performed, the intervention actions representing actions that can be taken to perform the inspection or repair, the resource requirement representing materials and equipment needed to perform the inspection or repair.

21. The system according to claim 20, wherein the processor is further configured to:
specify, according to the selected plan, at least one determined action and at least one undetermined action;
implement the at least one determined action; re-calculate the health index after the implementation of the at least one determined action;
compare the re-calculated health index against a pre-determined threshold; and
determine whether to implement the at least one undetermined action based on the comparison.

22. The system according to claim 21, wherein the processor is further configured to:
determine at least one constraint associated with performing maintenance of the infrastructure;
determine a long-term maintenance plan associated with the infrastructure, based on the calculated health index of components in the infrastructure and the determined constraint; estimate a cost of the determined long-term maintenance plan;
determine a first short-term maintenance plan associated with the infrastructure, the determined first short-term maintenance plan specifying one or more of: the subset of components, the timing, the intervention actions, and the resource requirement;
perform an action, among the intervention actions, specified in the determined first short-term maintenance plan;
update the determined constraint after performing the specified action; re-calculate the health index of the components in the infrastructure after performing the specified action; and
repeatedly perform determining the constraint, determining the long-term maintenance plan, estimating the cost, determining the first short-term maintenance plan, performing the action, updating the determined constraint, and re-calculating the health index.

23. A computer program product for maintaining an infrastructure of components, the computer program product comprising a storage medium readable by a processing circuit and storing instructions run by the processing circuit for performing a method, the method comprising:

receiving structured data, unstructured data, and infrastructure data from a database;

running at least one statistical and optimization modeler with one or more of: the received structured data, the received unstructured data and the received infrastructure data, in order to calculate a health index of at least one component of the infrastructure, the health index representing a health attribute of the at least one component, the calculation of the health index of the at least one component of the infrastructure including:

HI (health index)=×(F×R+W)×1, where F is a vector representing failure probabilities of the at least one component in the infrastructure, R represents a spatial correlation value of the at least one component and the W represents a time elapsed since a last maintenance of the at least one component, and 1 represents a vector of ones, wherein the vector F is a function of $\lambda \exp(\Sigma_{i=1}^{k} \beta_i Z_i)$, where $\lambda$ is any positive real number, $Z_i$ is a covariate, i is an index, k is a maximum number of the index, and $\beta_i$ is a variable representing one or more of: an age of the at least one component, a diameter of the at least one component, a length of the at least one component, a number of previous failures of the at least one component;

establishing at least one maintenance plan of the infrastructure, based on the calculated health index, each established maintenance plan being associated with at least one health index;

comparing health indices of the at least one established maintenance plan; and selecting a plan, among the at least one established maintenance plan, whose health index is a maximum among the compared health indices.

24. The computer program product according to claim 23, wherein the method further comprises:

specifying, according to the selected plan, at least one determined action and at least one undetermined action;

implementing the at least one determined action;

re-calculating the health index after the implementation of the at least one determined action;

comparing the re-calculated health index against a predetermined threshold; and determining whether to implement the at least one undetermined action based on the comparison.

* * * * *